United States Patent
Li et al.

(10) Patent No.: US 11,924,791 B2
(45) Date of Patent: Mar. 5, 2024

(54) USER EQUIPMENT, CENTRALIZED UNIT DEVICE, WIRELESS COMMUNICATION METHOD AND STORAGE MEDIUM

(71) Applicant: Sony Group Corporation, Tokyo (JP)

(72) Inventors: Kai Li, Shanghai (CN); Mingtuo Zhou, Shanghai (CN); Min Liu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 307 days.

(21) Appl. No.: 17/423,542

(22) PCT Filed: Feb. 7, 2020

(86) PCT No.: PCT/CN2020/074492
§ 371 (c)(1),
(2) Date: Jul. 16, 2021

(87) PCT Pub. No.: WO2020/164440
PCT Pub. Date: Aug. 20, 2020

(65) Prior Publication Data
US 2022/0078733 A1    Mar. 10, 2022

(30) Foreign Application Priority Data
Feb. 15, 2019   (CN) .......................... 201910117046.4

(51) Int. Cl.
*H04W 56/00*    (2009.01)
*H04B 17/364*    (2015.01)

(52) U.S. Cl.
CPC ........ *H04W 56/004* (2013.01); *H04B 17/364* (2015.01)

(58) Field of Classification Search
None
See application file for complete search history.

(56) References Cited

U.S. PATENT DOCUMENTS 10,871,575 B2 * 12/2020 Petrovic .................. H04B 7/01
2017/0046683 A1 * 2/2017 Shaw ................. G06Q 20/3224
(Continued)

FOREIGN PATENT DOCUMENTS

| CN | 102272625 A | 12/2011 |
| CN | 103428138 A | 12/2013 |

(Continued)

OTHER PUBLICATIONS

International Search Report and Written Opinion dated Apr. 24, 2020, received for PCT Application PCT/CN2020/074492, Filed on Feb. 7, 2020, 9 pages including English Translation.

(Continued)

*Primary Examiner* — Minh Trang T Nguyen
(74) *Attorney, Agent, or Firm* — XSENSUS LLP

(57) ABSTRACT

The present disclosure relates to a user equipment, a centralized unit device, a wireless communication method and a storage medium. The user equipment of the present disclosure comprises a processing circuit, wherein the processing circuit is configured to receive, from a centralized unit (CU) device, selection information related to a selection made by a distributed unit (DU) device; and determine, according to the selection information, a DU device for providing a service for the user equipment. By using the user equipment, the centralized unit device, the wireless communication method and the storage medium of the present disclosure, the user equipment can quickly and accurately find the most suitable DU device with the help of the CU device.

20 Claims, 11 Drawing Sheets

(56) References Cited

U.S. PATENT DOCUMENTS

| | | |
|---|---|---|
| 2018/0270699 A1 | 9/2018 | Babaei et al. |
| 2019/0150220 A1 | 5/2019 | Byun et al. |
| 2019/0159086 A1 | 5/2019 | Xu et al. |
| 2019/0166526 A1 | 5/2019 | Xu et al. |
| 2019/0222239 A1* | 7/2019 | Fox .................. H04B 7/01 |
| 2020/0084682 A1 | 3/2020 | Wang et al. |

FOREIGN PATENT DOCUMENTS

| | | | |
|---|---|---|---|
| CN | 107333241 A | 11/2017 | |
| CN | 107408978 A | 11/2017 | |
| CN | 107682053 A | 2/2018 | |
| CN | 108243391 A | 7/2018 | |
| CN | 108259079 A | 7/2018 | |
| CN | 108810968 A | 11/2018 | |
| CN | 109076627 A | 12/2018 | |
| CN | 109150388 A | 1/2019 | |
| CN | 109152086 A | 1/2019 | |
| CN | 109246747 A | 1/2019 | |
| CN | 109548095 A | 3/2019 | |
| CN | 110012480 A | 7/2019 | |
| CN | 110034877 A | 7/2019 | |
| EP | 3479647 A4 | 5/2019 | |
| EP | 3515148 A1 | 7/2019 | |
| KR | 20190006190 A | 1/2019 | |
| KR | 20190138781 A | 12/2019 | |
| KR | 20200009089 A | 1/2020 | |
| WO | 2017/072745 A1 | 5/2017 | |
| WO | 2018/080218 A1 | 5/2018 | |
| WO | WO-2018089803 A1 | 5/2018 | |
| WO | WO-2018170377 A1 | 9/2018 | |
| WO | 2018/203736 A1 | 11/2018 | |
| WO | 2018/203739 A1 | 11/2018 | |
| WO | 2018/231035 A1 | 12/2018 | |

OTHER PUBLICATIONS

Huawei et al., "Discussion on Numerology and Frame Structure for NTN", 3GPP TSG RAN WG1 Meeting #95, R1-1813660, Nov. 12-16, 2018, 3 pages.

Kodheli et al., "Integration of Satellites in 5G through LEO Constellations", arXiv:1706.06013v2, Jun. 30, 2017, 6 pages.

* cited by examiner

USER EQUIPMENT, CENTRALIZED UNIT DEVICE, WIRELESS COMMUNICATION METHOD AND STORAGE MEDIUM

CROSS-REFERENCE TO RELATED APPLICATIONS

The present application is based on PCT filing PCT/CN2020/074492, filed Feb. 7, 2020, which claims priority to Chinese Patent Application No. 201910117046.4, titled "USER EQUIPMENT, CENTRALIZED UNIT DEVICE, WIRELESS COMMUNICATION METHOD AND STORAGE MEDIUM", filed on Feb. 15, 2019 with the Chinese Patent Office, each of which is incorporated herein by reference in its entirety.

FIELD

The embodiments of the present disclosure generally relate to the field of wireless communication, and in particular to a user equipment, a Central Unit device, a wireless communication method and a computer readable storage medium. More particularly, the present disclosure relates to a user equipment in a wireless communication system, a Central Unit device in a wireless communication system, a wireless communication method performed by a user equipment in a wireless communication system, a wireless communication method performed by a Central Unit device in a wireless communication system, and a computer readable storage medium.

BACKGROUND

In a wireless communication system including a TN (Terrestrial network), a gNB-Central Unit (CU) plays a role as an information center and a management unit in a service coverage of a gNB. The gNB-CU is responsible for exchanging control information with a user equipment in the service coverage of the gNB. A gNB-Distributed Unit (DU) is responsible for exchanging data information with the user equipment in the service coverage of the gNB. The gNB-CU and the gNB-DU are integrated in the gNB, such that the gNB communicates with the user equipment.

In the above wireless communication system, both the CU and the DU are integrated in the gNB. For a wireless communication system in which a CU and a DU are separated from each other, there may be many DU devices that can be accessed by the user equipment. In this case, the user equipment is required to select a most suitable DU device to access the wireless communication system for information transmission. Therefore, in the wireless communication system in which the CU and the DU are separated from each other, how the user equipment quickly and accurately selects a DU device is one of technical problems to be solved urgently.

Therefore, it is desired to provide a technical solution by which the user equipment can quickly and accurately find a most suitable DU device.

SUMMARY

The summary part provides a general summary of the present disclosure, rather than a comprehensive disclosure of a full scope or all features of the present disclosure.

An object of the present disclosure is to provide a user equipment, a Central Unit device, a wireless communication method and a computer readable storage medium, by which the user equipment can quickly and accurately find a most suitable DU device.

A user equipment is provided according to an aspect of the present disclosure. The user equipment includes a processing circuit. The processing circuit is configured to: receive, from a Central Unit CU device, selection information related to selection of a Distributed Unit DU device; and determine, according to the selection information, a DU device serving the user equipment.

A Central Unit CU device is provided according to another aspect of the present disclosure. The CU device includes a processing circuit. The processing circuit is configured to: generate selection information related to selection of a Distributed Unit DU device serving a user equipment by the user equipment; and transmit the selection information to the user equipment.

A wireless communication method performed by a user equipment is provided according to another aspect of the present disclosure. The wireless communication method includes: receiving, from a Central Unit CU device, selection information related to selection of a Distributed Unit DU device; and determining, according to the selection information, a DU device serving the user equipment.

A wireless communication method performed by a Central Unit CU device is provided according to another aspect of the present disclosure. The wireless communication method includes: generating selection information related to selection of a Distributed Unit DU device serving a user equipment by the user equipment; and transmitting the selection information to the user equipment.

A computer readable storage medium is provided according to another aspect of the present disclosure. The computer readable storage medium includes executable computer instructions that, when executed by a computer, cause the computer to perform the wireless communication method provided in the present disclosure.

With the user equipment, the Central Unit device, the wireless communication method and the computer readable storage medium provided in the present disclosure, the CU device may generate selection information related to selection of a DU device, such that the user equipment may determine, according to the selection information received from the CU device, a DU device serving the user equipment. In this way, the user equipment can quickly and accurately find a most suitable DU device with the assistance of the CU device.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings:

FIG. 4 (b) is a schematic diagram of arranging a Central Unit device on a terrestrial base station device according to an embodiment of the present disclosure;

Figure 1:
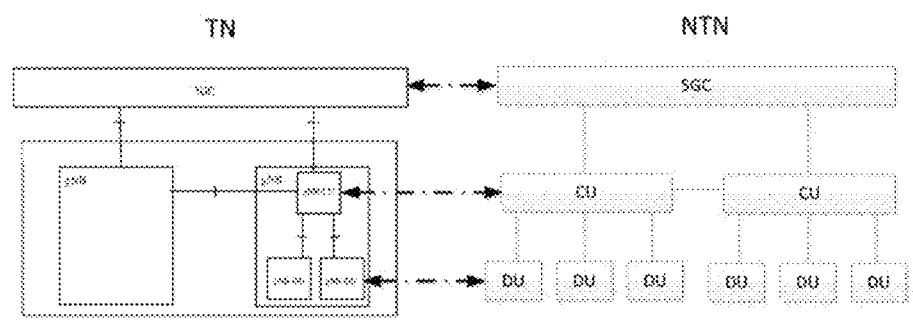
FIG. 1 is a schematic diagram showing comparison between an architecture of a non-terrestrial network and an architecture of a terrestrial network according to an embodiment of the present disclosure.

Although the present disclosure is susceptible to various modifications and substitutions, specific embodiments thereof are shown in the drawings as examples and are described in detail herein. However, it should be understood that the description of specific embodiments herein is not intended to limit the present disclosure into a disclosed specific form. Instead, the present disclosure aims to cover all modifications, equivalents and substitutions falling in the spirit and the scope of the present disclosure. It should be noted that, corresponding reference numerals indicate corresponding components throughout the drawings.

DETAILED DESCRIPTION OF EMBODIMENTS

Now, examples of the present disclosure are described more fully with reference to the drawings. The following description is merely illustrative in nature and is not intended to limit the present disclosure and application or use.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

The present disclosure is described in the following order:
1. Description of Scenario
2. Configuration Example of User Equipment
3. Configuration Example of Central Unit Device
4. Method Embodiment
5. Application Example 1. Description of Scenario As described above, for the wireless communication system in which the CU and the DU are separated from each other, there may be many DU devices that can be accessed by the user equipment. In this case, the user equipment is required to select a most suitable DU device to access the wireless communication system for information transmission. For such a scenario, there are provided a user equipment and a Central Unit device in a wireless communication system, a wireless communication method performed by the user equipment in the wireless communication system, a wireless communication method performed by the Central Unit device in the wireless communication system, and a computer-readable storage medium in the present disclosure, so that the user equipment can quickly and accurately find a most suitable DU device with the assistance of the CU device.

According to the embodiments of the present disclosure, the wireless communication system may be a fifth generation (5G) or sixth generation (6G) communication system. The wireless communication system provided in the present disclosure may be a satellite communication system including a non-terrestrial network (NTN). The satellite communication system may include multiple CU devices, multiple DU devices and multiple user equipments.

FIG. 1 is a schematic diagram showing comparison between an architecture of a non-terrestrial network and an architecture of a terrestrial network according to an embodiment of the present disclosure. A schematic diagram of the architecture of the TN is shown on a left part of FIG. 1, and a schematic diagram of the architecture of the NTN is shown on a right part of FIG. 1, where 5GC represents a core network of a 5G network. As shown in FIG. 1, in the TN network, each gNB includes one gNB-CU and multiple gNB-DUs. The gNB-CU is responsible for control information transmission with the user equipment. The gNB-DU is responsible for data information transmission with the user equipment. In addition, the gNB-CU may further manage a resource of each gNB-DU.

Furthermore, according to an embodiment of the present disclosure, multiple CU devices and multiple DU devices are provided in the NTN network, as shown in FIG. 1. The CU device is responsible for control information transmission with the user equipment. The DU device is responsible for data information transmission with the user equipment. In addition, each CU device may manage resources of multiple DU devices. Here, the CU device and the DU device may be separated from each other, that is, respectively arranged in devices that are separated from each other. In addition, according to an embodiment of the present disclosure, the CU device may be arranged according to geographical location, that is, one CU device that is activated may be arranged in each predetermined area, where the predetermined area may be referred to as a service coverage of the activated CU device. Optionally, the predetermined area may further include one or more CU devices (standby CU devices) that are not activated. For example, in a case that the CU device that is activated breaks down, one of the standby CU devices may be activated. Furthermore, a service coverage of a CU device that is activated may be a space service coverage, in which multiple DU devices and multiple user equipments are included. The multiple user equipments may be located in a terrestrial service coverage of the CU device.

The Distributed Unit (DU) device according to the present disclosure may be a satellite device in a satellite communication system. The DU device may be a Low Earth Orbit (LEO) satellite device and a Medium Earth Orbit (MEO) satellite device.

The Central Unit (CU) device according to the present disclosure may be a satellite device in the satellite communication system. The CU device may be a Geosynchronous Orbit (GEO) satellite device. The GEO satellite device is stationary relative to a user equipment and a base station device on ground, and has the smallest Doppler shift effect among all types of satellite device. In addition, the GEO satellite device has a relative large coverage, facilitating information collection. Therefore, the GEO satellite device is suitable as a CU device.

The CU device according to the present disclosure may also be a terrestrial base station device in the satellite communication system, such as an eNB, or a gNB (a base station in a fifth generation communication system). A delay between the terrestrial base station device and the user equipment is small, and the terrestrial base station device is close to a 5G core network. Therefore, the terrestrial base station device may also serve as a CU device.

The user equipment according to the present disclosure may be a mobile terminal (such as a smartphone, a tablet personal computer (PC), a notebook PC, a portable game terminal, a portable/dongle mobile router and a digital camera) or a vehicle terminal (such as a vehicle navigation device). The user equipment may further be implemented as a terminal performing machine to machine (M2M) communication (which is also referred to as a machine type communication (MTC) terminal). In addition, the user equipment may further be a wireless communication module (such as an integrated circuit module including a single wafer) mounted on each of the above terminals.

2. Configuration Example of User Equipment

Figure 2:
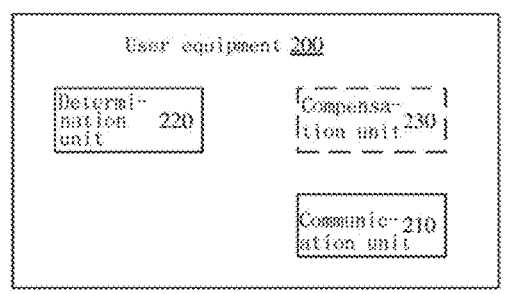
FIG. 2 is a block diagram showing a configuration example of a user equipment according to an embodiment of the present disclosure.

FIG. 2 is a block diagram showing a configuration example of a user equipment 200 according to an embodiment of the present disclosure.

As shown in FIG. 2, the user equipment 200 may include a communication unit 210 and a determination unit 220.

Here, units of the user equipment 200 may be included in a processing circuit. It should be noted that the user equipment 200 may include one processing circuit or multiple processing circuits. Further, the processing circuit may include various separate functional units to perform various functions and/or operations. It should be noted that these functional units may be physical entities or logical entities, and units with different names may be implemented by one physical entity.

According to an embodiment of the present disclosure, the user equipment 200 may receive, from a CU device, selection information related to selection of a DU device through the communication unit 210. Here, the user equipment 200 may receive the selection information from a CU device serving the user equipment 200. The DU device included in the selection information may be a DU device managed by the DU device.

According to an embodiment of the present disclosure, the determination unit 220 may determine, according to the selection information, a DU device serving the user equipment 200.

It can be seen that, the user equipment 200 according to the embodiments of the present disclosure may determine, according to the selection information received from the CU device, the DU device serving the user equipment 200. In this way, the user equipment can quickly and accurately find a most suitable DU device with the assistance of the CU device.

As described above, according to an embodiment of the present disclosure, in a case that the wireless communication system in which the user equipment, the CU device and the DU device are located is a satellite communication system, the CU device may be a terrestrial base station device or a GEO satellite device, and the DU device may be a LEO satellite device or a MEO satellite device. In this case, the user equipment 200 can quickly and accurately find a most suitable LEO satellite device or MEO satellite device with the assistance of the CU device, so as to successfully access the satellite communication system.

Figure 3:
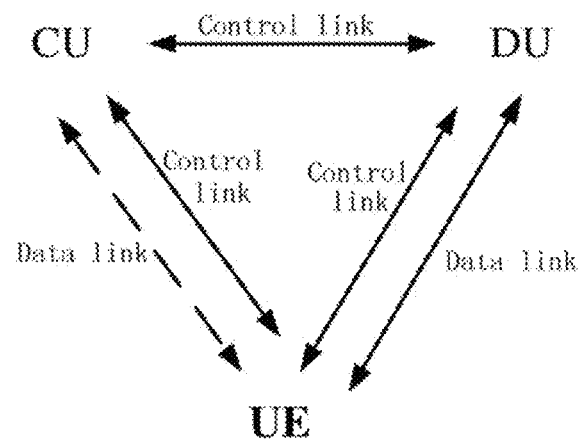
FIG. 3 is a schematic diagram showing transmission links between a user equipment, a Central Unit device and a Distributed Unit device according to an embodiment of the present disclosure.

FIG. 3 is a schematic diagram showing transmission links between a user equipment, a Central Unit device and a Distributed Unit device according to an embodiment of the present disclosure. As shown in FIG. 3, there is a control link for transmitting control information between the CU device and the DU device managed by the CU device. For example, the CU device may manage a resource of the DU device. There is a control link for transmitting control information between the CU device and the user equipment (UE). Here, in a case that the CU device is a GEO satellite device, there may be only a control link between the CU device and the UE. In the case that the CU device is a terrestrial base station device, there may further be a data link for transmitting data information between the CU device and the UE. Furthermore, there may be a data link for transmitting data information between the UE and the DU device. In addition, there may further be a control link between the UE and the DU device, used for transmitting simple control information after the UE successfully accesses the DU device. According to an embodiment of the present disclosure, the UE may transmit control information through the control link between the UE and the CU, so as to access the wireless communication system, and then the UE may transmit data information through the data link between the UE and the DU device, so as to perform a normal service. After accessing the wireless communication system, the UE may also transmit some simple control information through the control link between the UE and the DU.

Figure 4A:
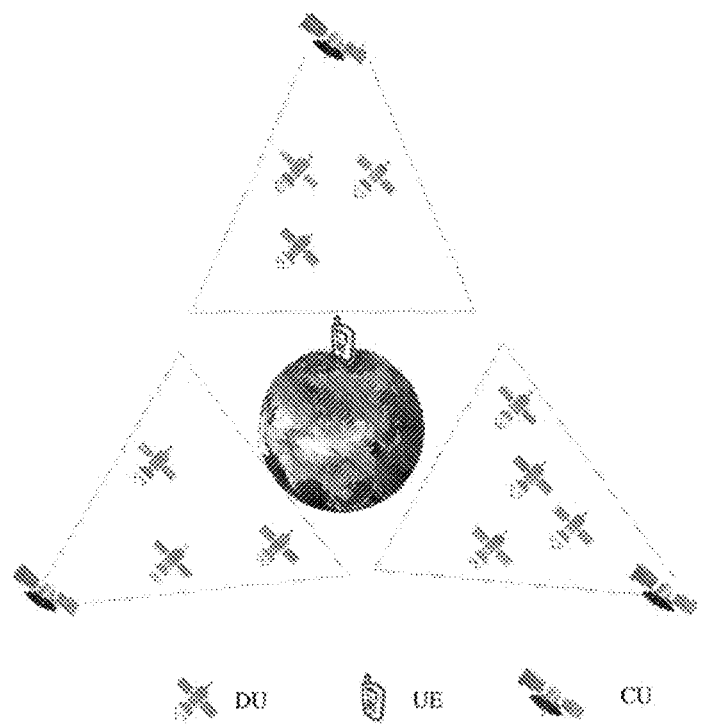
FIG. 4 (a) is a schematic diagram of arranging a Central Unit device on a geosynchronous orbit satellite according to an embodiment of the present disclosure.
Figure 4B:
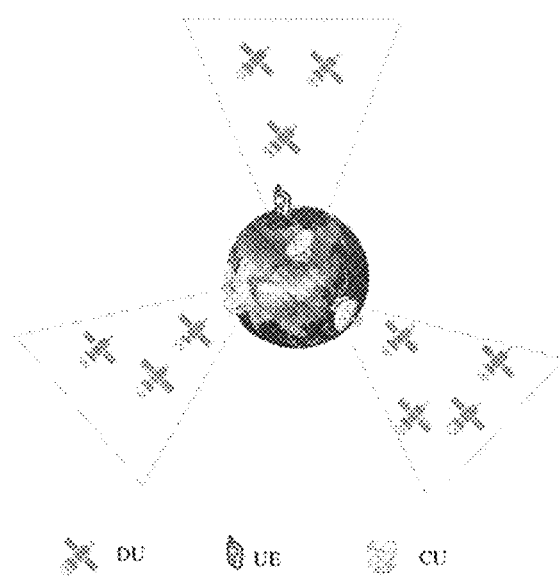

FIG. 4 (a) is a schematic diagram of arranging a Central Unit device on a geosynchronous orbit satellite according to an embodiment of the present disclosure. As shown in FIG. 4 (a), a satellite communication system may include multiple CU devices, multiple DU devices and multiple UEs. Each of the CU devices is a GEO satellite device. Each of the DU devices is a LEO satellite device or a EO satellite device. FIG. 4 (a) shows a service coverage of each of the CU devices with a dotted box. Each of the CU devices may manage a DU device and a UE that are in a service coverage of the CU device. According to an embodiment of the present disclosure, each of the UEs may receive selection information related to selection of a LEO satellite device or a EO satellite device from a GEO satellite device serving the UE, so as to determine a LEO satellite device serving the UE or a MEO satellite device serving the UE.

FIG. 4 (b) is a schematic diagram of arranging a Central Unit device on a terrestrial base station device according to an embodiment of the present disclosure. As shown in FIG. 4 (b), a satellite communication system may include multiple CU devices, multiple DU devices, and multiple UEs. Each of the CU devices is a terrestrial base station device. Each of the DU devices is a LEO satellite device or a MEO satellite device. FIG. 4 (b) shows a space service coverage of each of the terrestrial base station devices with a dotted box. Each of the CU devices may manage a DU device and a UE that are in a service coverage of the CU device. According to an embodiment of the present disclosure, each of the UEs may receive selection information related to selection of a LEO satellite device or a EO satellite device from a terrestrial base station device serving the UE, so as to determine a LEO satellite device serving the UE or a MEO satellite device serving the UE.

According to an embodiment of the present disclosure, the determination unit 220 may further determine, according to the selection information, a Doppler shift value between the user equipment 200 and the DU device serving the user equipment 200.

According to an embodiment of the present disclosure, as shown in FIG. 2, the user equipment 200 may further include a compensation unit 230. The compensation unit 230 is configured to compensate a Doppler shift of a link between the user equipment 200 and the DU device serving the user equipment 200. For example, after the determination unit 220 determines the Doppler shift value between the user equipment 200 and the DU device, the compensation unit 230 may compensate the link between the user equipment 200 and the DU device serving the user equipment 200 according to the Doppler shift value determined by the determination unit 220. According to an embodiment of the present disclosure, the compensation unit 230 may compensate, according to the Doppler shift value determined by the determination unit 220, a frequency of a signal of an uplink between the user equipment 200 and the DU device. The compensation unit 230 may also compensate, according to the Doppler shift value determined by the determination unit 220, a frequency of a signal of a downlink between the user equipment 200 and the DU device. In addition, the Doppler shift of the link between the user equipment 200 and the DU device serving the user equipment 200 may also be compensated by the DU device serving the user equipment 200. According to an embodiment of the present disclosure, the DU device serving the user equipment 200 may compensate, according to the Doppler shift value between the user equipment 200 and the DU device, the frequency of the signal of the uplink between the user equipment 200 and the DU device. The DU device serving the user equipment 200 may also compensate, according to the Doppler shift value between the user equipment 200 and the DU device, the frequency of the signal of the downlink between the user equipment 200 and the DU device. Furthermore, the DU device may compensate the Doppler shift by on-board processing (OBP), that is, all processing is performed on a satellite, such that an error that may be caused by a forwarding process in communication can be reduced.

In a case that the DU device is a LEO satellite device or a EO satellite device, since a speed of the LEO satellite device or the MEO satellite device relative to the earth is relative large, a Doppler shift effect between the LEO satellite device or the EO satellite device and the user equipment 200 may greatly affect communication quality. As described above, according to an embodiment of the present disclosure, the user equipment 200 may determine, according to the selection information, the DU device serving the user equipment 200 and the Doppler shift value between the user equipment 200 and the DU device. In this way, the user equipment 200 may compensate the Doppler shift between the user equipment 200 and the DU device. That is, with the assistance of the CU device, the user equipment 200 can access a suitable DU device and determine a Doppler shift value between the user equipment 200 and the DU device, thereby reducing an initial Doppler shift during the user equipment 200 accessing the wireless communication system. In the conventional technologies, before successfully accessing the NTN, the user equipment 200 is required to scan a frequency band and a beam of the DU device to determine a Doppler shift value, which is very time-consuming. According to an embodiment of the present disclosure, the user equipment 200 directly receives the Doppler shift value from the CU device, thereby avoiding time consumption in scanning the frequency band and the beam.

According to an embodiment of the present disclosure, the determination unit 220 may determine a DU device included in the selection information as the DU device serving the user equipment 200. That is, the selection information may include a DU device serving the user equipment 200, such that the user equipment 200 can directly determine the DU device serving the user equipment 200 according to the selection information. Further, according to an embodiment of the present disclosure, the selection information may include one DU device or multiple DU devices (for example, ranked according to an order of priority), such that the determination unit 220 may select one DU device from the multiple DU devices as the DU device serving the user equipment 200.

According to an embodiment of the present disclosure, the determination unit 220 may further determine a Doppler shift value corresponding to the DU device that is included in the selection information as the Doppler shift value between the user equipment 200 and the DU device serving the user equipment 200. That is, the selection information may include a DU device serving the user equipment 200 and the Doppler shift value between the user equipment 200 and the DU device, such that the user equipment 200 may directly determine, according to the selection information, the DU device serving the user equipment 200 and the Doppler shift value between the user equipment 200 and the DU device. Further, according to an embodiment of the present disclosure, the selection information may include one DU device and a Doppler shift value corresponding to the DU device. The selection information may also include multiple DU devices (for example, ranked according to an order of priority) and multiple Doppler shift values respectively corresponding to the multiple DU devices, such that the determination unit 220 may select one DU device from the multiple DU devices as the DU device serving the user equipment 200 and determine a Doppler shift value corresponding to the DU device.

Table 1 and Table 2 respectively show two examples of contents included in the selection information. As shown in Table 1, the selection information includes only one DU device and a Doppler shift value corresponding to the DU device. As shown in Table 2, the selection information includes n DU devices and n Doppler shift values respectively corresponding to the n DU devices.

TABLE 1

| DU device identification | Doppler shift value |
| --- | --- |
| | |

TABLE 2

| DU device identification 1 | Doppler shift value 1 |
| --- | --- |
| DU device identification 2 | Doppler shift value 2 |
| ... | ... |
| DU device identification n | Doppler shift value n |

According to an embodiment of the present disclosure, the determination unit 220 may further determine, according to the selection information, a beam direction of the DU device serving the user equipment 200. Further, the determination unit 220 may determine, according to the selection information, an access ID for the user equipment 200 accessing the DU device serving the user equipment 200. That is, the selection information may further include some other information of the DU device serving the user equipment 200.

According to an embodiment of the present disclosure, the user equipment 200 may transmit, through the communication unit 210, at least one of the following parameters of the user equipment 200 to the CU device: Quality-of-Service QoS requirement information, location information and speed information, such that the user equipment 200 may receive, from the CU device, selection information generated based on the at least one parameter.

According to an embodiment of the present disclosure, the QoS requirement information of the user equipment 200 may include information such as a maximum bandwidth of the user equipment 200, a minimum Doppler shift value of the user equipment 200, a minimum delay between the user equipment 200 and the CU device. The user equipment 200 may transmit the QoS requirement information to the CU device, such that the CU device determines, according to the QoS requirement information, a DU device included in the selection information. That is, the CU device determines, according to the QoS requirement information, the DU device serving the user equipment 200.

According to an embodiment of the present disclosure, the user equipment 200 may acquire the location information and the speed information of the user equipment 200. For example, the user equipment 200 may include a Global Positioning System (GPS) unit (not shown) to determine a location and a speed of the user equipment 200. Further, the user equipment 200 may transmit the location information and the speed information of the user equipment 200 to the CU device, such that the CU device may calculate, according to the location information and the speed information of the user equipment 200, the Doppler shift value between the user equipment 200 and the DU device serving the user equipment 200.

According to an embodiment of the present disclosure, after the determination unit 220 determines the DU device serving the user equipment 200 and the Doppler shift value corresponding to the DU device, the user equipment 200 may further receive an updated Doppler shift value through the communication unit 210.

According to an embodiment of the present disclosure, the updated Doppler shift value between the user equipment 200 and the DU device serving the user equipment 200 may be transmitted by the CU device. In this case, the user equipment 200 may transmit a Doppler shift value update request to the CU device through the communication unit 210, such that the CU device may recalculate, in response to the request, the Doppler shift value between the user equipment 200 and the DU device serving the user equipment 200. Preferably, the Doppler shift value update request may include updated location information and updated speed information of the user equipment 200. Furthermore, the CU device may recalculate, in response to the Doppler shift value update request transmitted by the DU device serving the user equipment 200, the Doppler shift value between the user equipment 200 and the DU device serving the user equipment 200.

According to an embodiment of the present disclosure, the updated Doppler shift value between the user equipment 200 and the DU device serving the user equipment 200 may be transmitted by the DU device serving the user equipment 200. In this case, the user equipment 200 has already accessed the DU device, that is, the user equipment 200 has already started performing transmission of data information with the DU device. In this case, the user equipment 200 may transmit a Doppler shift value update request to the DU device through the communication unit 210, such that the DU device may recalculate, in response to the request, the Doppler shift value between the user equipment 200 and the DU device. Similarly, the Doppler shift value update request may include updated location information and updated speed information of the user equipment 200.

As described above, according to an embodiment of the present disclosure, the selection information received by the user equipment 200 may include the DU device determined by the CU device for the user equipment 200, and optionally may further include the Doppler shift value between the user equipment 200 and the DU device, such that the user equipment may access a suitable DU device and compensate the Doppler shift effect. Further, the user equipment 200 may update the Doppler shift value between the user equipment 200 and the DU device.

Based on the above embodiments of the present disclosure, the user equipment 200 may transmit request information for selecting a DU device to the CU device through the communication unit 210. Preferably, the request information for selecting a DU device may include at least one of the following information: Quality-of-Service QoS requirement information, location information, and speed information. In this case, the user equipment 200 is required to be connected to the CU device to establish an uplink and a downlink. In this way, the CU device may determine, in response to the request information for selecting a DU device transmitted by the user equipment 200, a DU device and a Doppler shift value for the user equipment 200.

According to an embodiment of the present disclosure, the user equipment 200 may not transmit the request information for selecting a DU device to the CU device, but determines a DU device serving the user equipment 200 and the Doppler shift value according to the selection information periodically transmitted by the CU device. The above operation is applicable to a case that the user equipment 200 is connected to the CU device, and is particularly applicable to a case that the user equipment 200 cannot be connected to the CU device. For example, a case that the user equipment 200 has a limited transmission power, and thus cannot be connected to the CU device, or a case that the CU device is a terrestrial base station device and the wireless communication system includes no TN link, resulting in that the user equipment 200 cannot be connected to the terrestrial base station device.

According to an embodiment of the present disclosure, the selection information received by the user equipment 200 may include a mapping relationship between location information of the user equipment 200 and the DU device serving the user equipment 200. According to an embodiment of the present disclosure, the selection information may include a mapping relationship between each of multiple location areas in the terrestrial service coverage of the CU device and a DU device corresponding to the location area. Here, each location area may correspond to one or more DU devices (for example, ranked in an order of priority).

According to an embodiment of the present disclosure, the determination unit 220 may determine, according to the location information of the user equipment 200 and the mapping relationship in the selection information, the DU device serving the user equipment 200.

According to an embodiment of the present disclosure, the determination unit 220 may determine a location area corresponding to the user equipment 200 according to the location information of the user equipment 200, and determine, according to the mapping relationship, a DU device corresponding to the location area. In a case that there is only one DU device corresponding to the location area, the determination unit 220 may directly determine the DU device as the DU device serving the user equipment 200. In a case that there are multiple DU devices corresponding to the location area, the determination unit 220 may select one DU device from the multiple DU devices as the DU device serving the user equipment 200. For example, the determination unit 220 may select the DU device according to the priority of the multiple DU devices, which is not limited in the present disclosure.

According to an embodiment of the present disclosure, the selection information received by the user equipment 200 may further include a mapping relationship between the location information of the user equipment 200 and the Doppler shift value between the user equipment 200 and the DU device serving the user equipment 200. That is, the selection information may include multiple location areas in the terrestrial service coverage of the CU device, a DU device corresponding to each of the multiple location areas, and a Doppler shift value corresponding to each DU device.

According to an embodiment of the present disclosure, the determination unit 220 may determine, according to the location information of the user equipment 200 and the mapping relationship, the Doppler shift value between the user equipment 200 and the DU device serving the user equipment 200. For example, the determination unit 220 may determine the location area corresponding to the user equipment 200 according to the location information of the user equipment 200, and determine a DU device and a Doppler shift value that correspond to the location area according to the mapping relationship.

Table 3 and Table 4 respectively show two examples of the selection information. As shown in Table 3, the selection information includes: m location areas, DU device identifications and Doppler shift values respectively corresponding to the m location areas. For example, if determining that a location of the user equipment 200 is located in a location area 2, the determination unit 220 determines a DU device with an identification 2 as the DU device serving the user equipment 200 and determines a Doppler shift value 2 as the Doppler shift value between the user equipment 200 and the DU device. As shown in Table 4, the selection information includes m location areas, multiple DU device identifications and multiple Doppler shift values corresponding to each of the m location areas. Taking a location area 1 as an example, there are p DU devices corresponding to the location area 1 and p Doppler shift values corresponding to the location area 1. If determining that the location of the user equipment 200 is located in the location area 1, the determination unit 220 selects one DU device from the p DU devices that are respectively with identifications from 11 to 1p, as the DU device serving the user equipment 200, and determines a corresponding Doppler shift value.

TABLE 3

| Location area 1 | DU device identification 1 | Doppler shift value 1 |
|---|---|---|
| Location area 2 | DU device identification 2 | Doppler shift value 2 |
| ... | ... | ... |
| Location area m | DU device identification m | Doppler shift value m |

TABLE 4

| Location area 1 | DU device identification 11 | Doppler shift value 11 |
| | DU device identification 12 | Doppler shift value 12 |
| | ... | ... |
| | DU device identification 1p | Doppler shift value 1p |
| Location area 2 | DU device identification 21 | Doppler shift value 21 |
| | DU device identification 22 | Doppler shift value 22 |
| | ... | ... |
| | DU device identification 2p | Doppler shift value 2p |
| ... | ... | ... |
| Location area m | DU device identification m1 | Doppler shift value m1 |
| | DU device identification m2 | Doppler shift value m2 |
| | ... | ... |
| | DU device identification mp | Doppler shift value mp |

According to an embodiment of the present disclosure, the selection information may further include a mapping relationship between the location information of the user equipment 200 and the beam direction of the DU device serving the user equipment 200, such that the determination unit 220 may further determine the beam direction of the DU device serving the user equipment 200 according to the selection information. The selection information may further include a mapping relationship between the location information of the user equipment 200 and an access ID for the user equipment 200 accessing the DU device serving the user equipment 200, such that the determination unit 220 may further determine, according to the selection information, the access ID for the user equipment 200 accessing the DU device serving the user equipment 200.

Figure 5:
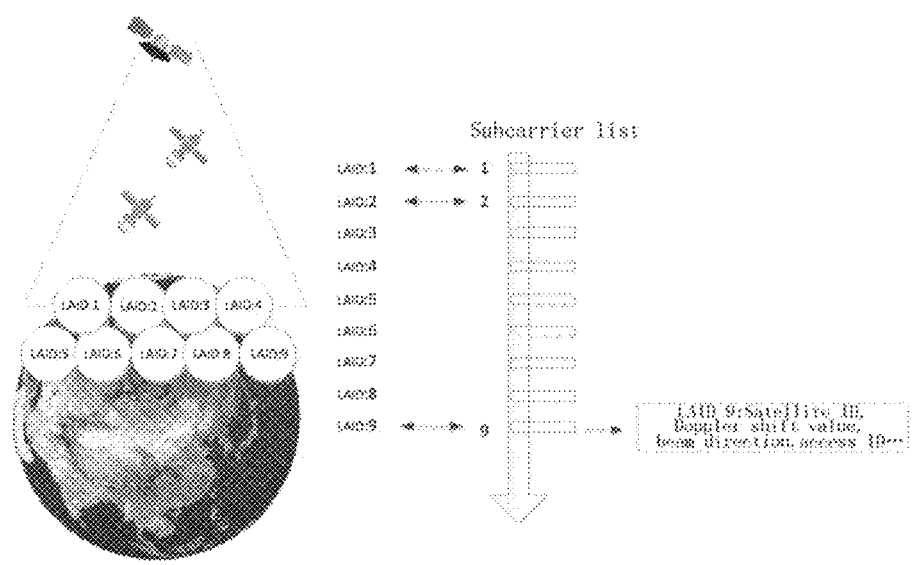
FIG. 5 is a schematic diagram showing a mapping table between location information, a Distributed Unit device and a Doppler shift value according to an embodiment of the present disclosure.

FIG. 5 is a schematic diagram showing a mapping table between location information, a Distributed Unit device and a Doppler shift value according to an embodiment of the present disclosure. As shown in FIG. 5, the CU device is a GEO satellite device, and the DU device is a satellite device. The CU device determines nine location areas on the ground, where each of the location areas is identified with a location area ID (LAID). According to an embodiment of the present disclosure, each location area obtained by the CU device dividing a coverage area of the CU device on the ground may be referred to as a virtual cell location area. Each virtual cell location area is identified with a VCLID (virtual cell location area ID). For each location area, the CU device may transmit, by using a subcarrier, a mapping relationship between the location area, a DU device and a Doppler shift value. Optionally, the mapping relationship may further include a beam direction of the DU device and/or the access ID of the user equipment 200.

According to an embodiment of the present disclosure, the user equipment 200 may determine, according to the location information of the user equipment 200, a subcarrier for monitoring the selection information. Here, the user equipment 200 may know a correspondence between the location areas and subcarriers in advance. After determining a location area in which the user equipment 200 is located, the user equipment 200 may determine a subcarrier corresponding to the location area, so as to monitor the selection information on the subcarrier.

Figure 6:
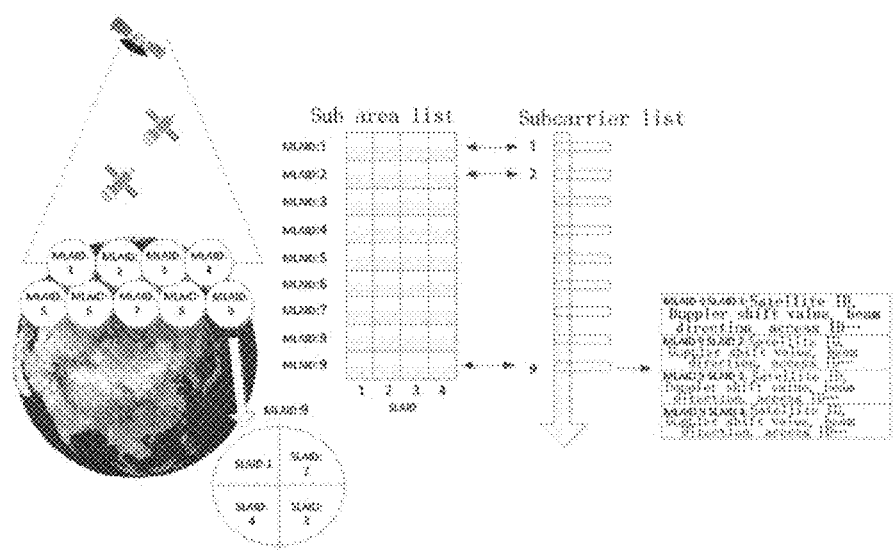
FIG. 6 is a schematic diagram showing a mapping table between location information, a Distributed Unit device and a Doppler shift value according to another embodiment of the present disclosure.

FIG. 6 is a schematic diagram showing a mapping table between location information, a Distributed Unit device and a Doppler shift value according to another embodiment of the present disclosure. As shown in FIG. 6, the CU device is a GEO satellite device, and the DU device is a satellite device. The CU device determines nine main location areas on the ground. Each of the main location areas is identified with a main location area ID (MLAID). Furthermore, each main location area is divided into four sub location areas. Here each sub location area is identified with a sub location area ID (SLAID). For each main location area, the CU device may transmit, by using a subcarrier, a mapping relationship between each of the four sub location areas included in the main location area, a DU device, and a Doppler shift value. Optionally, the mapping relationship may further include a beam direction of the DU device and/or an access ID of the user equipment 200.

Similarly, the user equipment 200 may determine, according to the location information of the user equipment 200, a subcarrier for monitoring the selection information. According to an embodiment of the present disclosure, the user equipment 200 may know a correspondence between the main location areas and subcarriers in advance. After determining a main location area in which the user equipment 200 is located, the user equipment 200 may determine subcarriers corresponding to the main location area, so as to monitor the selection information on the subcarriers. Furthermore, the user equipment 200 may determine a sub location area in which the user equipment 200 is located, and may determine, according to the selection information, a DU device and a Doppler shift value that correspond to the sub location area.

According to an embodiment of the present disclosure, the user equipment 200 may receive selection information that is transmitted by the CU device by broadcasting. Furthermore, the user equipment 200 may receive selection information that is periodically transmitted by the CU device by broadcasting.

As described above, according to an embodiment of the present disclosure, the user equipment 200 may receive the selection information that is periodically transmitted by the CU device, and thus may determine, according to the mapping relationship included in the selection information, the DU device serving the user equipment 200 and the Doppler shift value, such that the user equipment can access a suitable DU device and compensate the Doppler shift effect.

Figure 7:
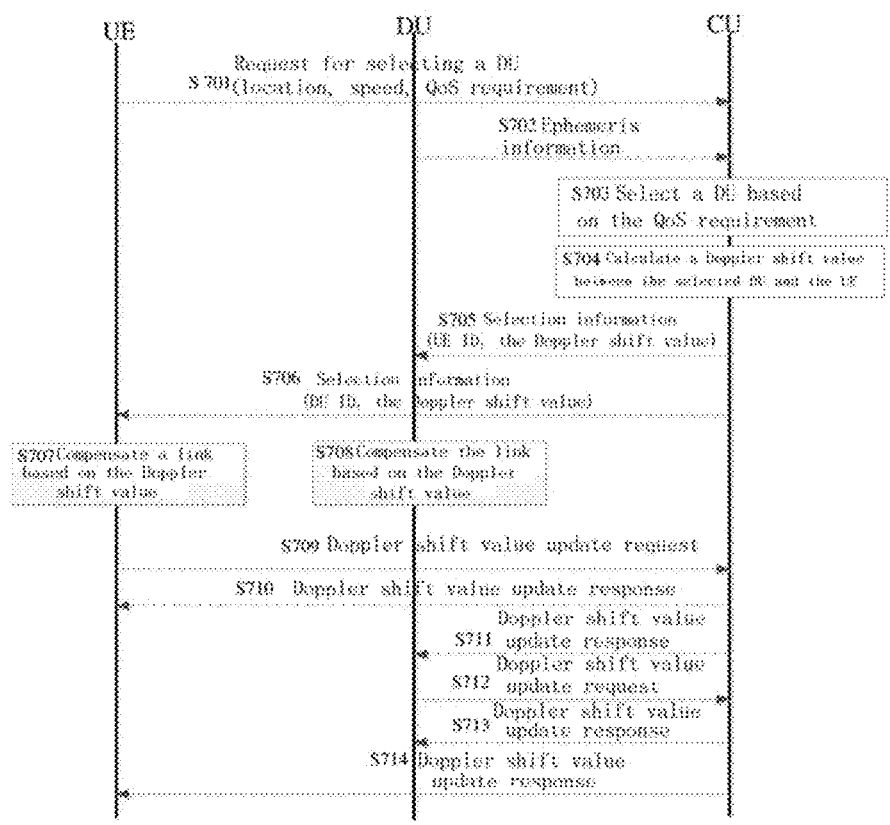
FIG. 7 is a signaling flowchart showing a process of calculating and updating a Doppler shift value according to an embodiment of the present disclosure.

FIG. 7 is a signaling flowchart showing a process of calculating and updating a Doppler shift value according to an embodiment of the present disclosure. In FIG. 7, a UE may be implemented by the user equipment 200, and the UE may establish a link with a CU device. As shown in FIG. 7, in step S701, the UE transmits request information for selecting a DU to the CU device. Here, the request information for selecting a DU may include location information, speed information and QoS requirement information of a UE. In step S702, the DU device may transmit ephemeris information of the DU device to the CU device. Here, the DU device may periodically transmit the ephemeris information. The ephemeris information may include, for example, location information, trajectory information, speed information, beam direction information, an access ID and frequency information of the DU. Next, in step S703, the CU device may select a suitable DU device based on the QoS requirement information of the UE. Next, in step S704, the CU device may calculate a Doppler shift value between the UE and the selected DU device. For example, the CU device may calculate the Doppler shift value between the UE and the selected DU device based on the location information and the speed information of the UE and the ephemeris information of the DU device. Next, in step S705, the CU device may transmit selection information to the selected DU device. The selection information may include an ID of a UE that is to access the DU device and a Doppler shift value between the DU device and the UE. In step S706, the CU device may transmit selection information to the UE. The selection information may include an ID of the DU device serving the UE and a corresponding Doppler shift value. Next, in step S707, the UE compensates the link between the UE and the DU based on the Doppler shift value received by the UE, and in step S708, the DU compensates the link between the UE and the DU based on the Doppler shift value received by the DU. Optionally, in step S709, the UE transmits a Doppler shift value update request to the CU device. Next, in step S710, the CU device transmits a Doppler shift value update response to the UE. The Doppler shift value update response includes an updated Doppler shift value. In step S711, the CU device transmits a Doppler shift value update response to the DU device. The Doppler shift value update response includes an updated Doppler shift value. Optionally, in step S712, the DU device transmits a Doppler shift value update request to the CU device. Next, in step S713, the CU device transmits a Doppler shift value update response to the DU device. The Doppler shift value update response includes an updated Doppler shift value. In step S714, the CU device transmits a Doppler shift value update response to the UE. The Doppler shift value update response includes an updated Doppler shift value. As described above, both the UE and the DU device can acquire the Doppler shift value between UE and the DU device, as shown in FIG. 7. In addition, the Doppler shift value may be updated.

Figure 8:
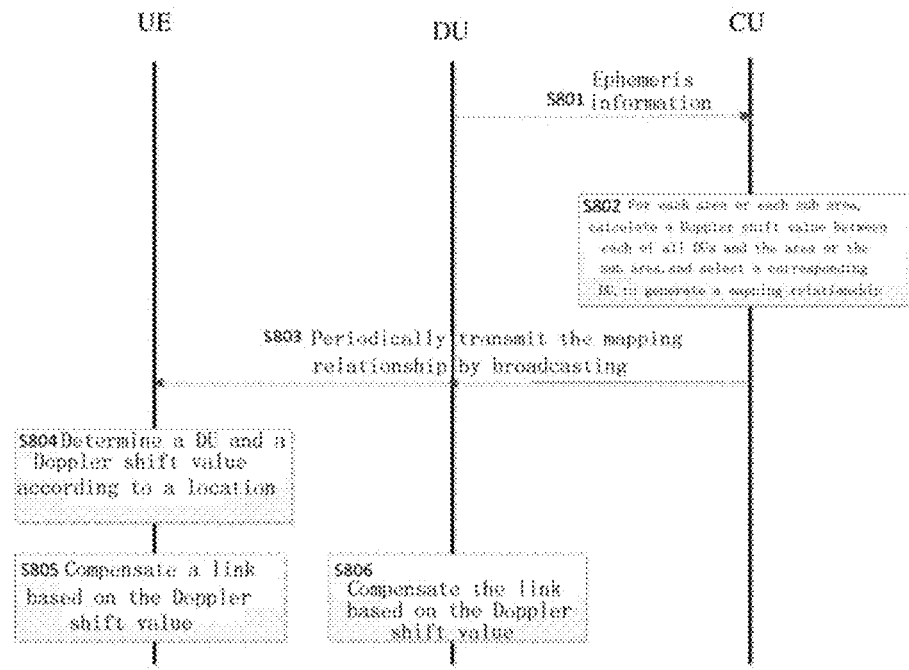
FIG. 8 is a signaling flowchart showing a process of calculating and updating a Doppler shift value according to another embodiment of the present disclosure.

FIG. 8 is a signaling flowchart showing a process of calculating and updating a Doppler shift value according to another embodiment of the present disclosure. In FIG. 8, the UE may be implemented by the user equipment 200. The UE may establish a link with a CU device, or the UE cannot establish a link with the CU device. As shown in FIG. 8, in step S801, a DU device may transmit ephemeris information of the DU device to the CU device. Here, the DU device may periodically transmit the ephemeris information. The ephemeris information includes, for example, location information, trajectory information, speed information, beam direction information, an access ID and frequency information of the DU. Next, in step S802, for each location area or each sub location area, the CU device may calculate a Doppler shift value between each of all DU devices and the location area or the sub location area, and select, according to the calculated Doppler shift values, one or more DU devices as a DU device corresponding to the location area or the sub location area, so as to generate a mapping relationship. Here, the CU device may calculate the Doppler shift value based on a location point in the location area or the sub location area. It should be noted that in step S802, the CU device may select a DU device according to calculated Doppler shift values. In practice, the CU device may select a DU device according to other parameters. Next, in step S803, the CU device periodically transmits the mapping relationship by broadcasting. Next, in step S804, the UE receives the mapping relationship transmitted by the CU device by broadcasting, and determines, according to a location of the UE, a DU device serving the UE and a Doppler shift value. Next, in step S805, the UE compensate a link between the UE and the DU based on the Doppler shift value received by the UE, and in step S806, the DU compensate the link between the UE and the DU based on the Doppler shift value received by the DU. Here, since the UE may periodically receive the mapping relationship transmitted by the CU device, the Doppler shift value between the UE and the DU device may be updated periodically. As described above, both the UE and the DU device can acquire the Doppler shift value between the UE and the DU device, as shown in FIG. 8. In addition, both the UE and the DU device can periodically update the Doppler shift value.

As described above, two implementations of the user equipment 200 according to the embodiments of the present disclosure are described in detail. In the first implementation, the user equipment 200 receives the selection information transmitted by the CU device by unicasting. In the second implementation, the user equipment 200 receives the selection information transmitted by the CU device by broadcasting. According to an embodiment of the present disclosure, the above two implementations may be used independently. For example, in a case that the user equipment 200 is required to access a DU device, the user equipment 200 transmits request information for selecting a DU device to the CU device and determines the DU device and a Doppler shift value according to the selection information received from the CU device. For another example, the CU device periodically transmits selection information including a mapping relationship between location information, a DU device and a Doppler shift value, and the user equipment 200 may determine a DU device and a Doppler shift value based on the selection information that is periodically received by the user equipment 200. According to an embodiment of the present disclosure, the above two implementations may be used together. For example, the CU device periodically transmits the selection information including a mapping relationship between location information, a DU device and a Doppler shift value. On reception of the request information for selecting a DU from the user equipment 200, the CU device may generate selection information including a DU device selected for the user equipment 200 and a Doppler shift value. For another example, the CU device periodically transmits the selection information including a mapping relationship between location information, a DU device and a Doppler shift value, and the user equipment 200 may determine that the user equipment 200 cannot establish a link with the DU device, and in this case, the user equipment 200 directly determines a DU device and a Doppler shift value according to the selection information that is periodically received by the user equipment 200. For another example, the CU device periodically transmits the selection information including a mapping relationship between location information, a DU device and a Doppler shift value. In a case that the user equipment 200 is required to access a DU device, the user equipment 200 transmits request information for selecting a DU to the CU device. If no response information for the request information is received from the CU device, the user equipment 200 determines the DU device and the Doppler shift value according to the selection information that is periodically received by the user equipment 200. The above description is only exemplary illustration, and the use of the above two implementations is not limited in the present disclosure.

It can be seen that, the user equipment 200 according to the embodiments of the present disclosure may determine, according to the selection information received from the CU device, the DU device serving the user equipment 200. In this way, the user equipment can quickly and accurately find a most suitable DU device with the assistance of the CU device. Furthermore, the user equipment 200 may determine, according to the selection information received from the CU device, the Doppler shift value between the user equipment 200 and the DU device serving the user equipment 200, so as to compensate the link between the user equipment 200 and the DU device. In addition, the user equipment may receive the selection information transmitted by the CU device by unicasting or broadcasting. The user equipment 200 may further update the Doppler shift value between the user equipment 200 and the DU device. That is, with the assistance of the CU device, the user equipment 200 can access a more suitable DU device and determine the Doppler shift value between the user equipment 200 and the DU device, thereby reducing the initial Doppler shift during the user equipment 200 accessing the wireless communication system.

3. Configuration Example of Central Unit Device

Figure 9:
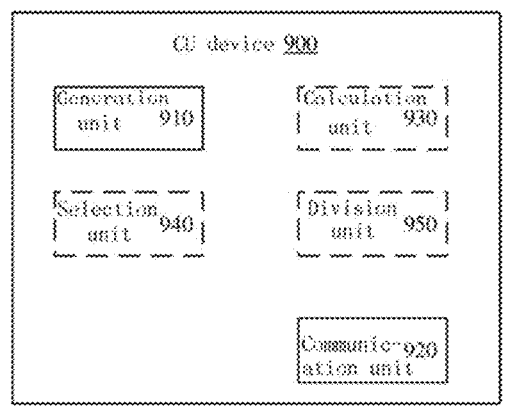
FIG. 9 is a block diagram showing a configuration example of a Central Unit device according to an embodiment of the present disclosure.

FIG. 9 is a block diagram showing a structure of a CU device 900 in a wireless communication system according to an embodiment of the present disclosure. As shown in FIG. 9, the CU device 900 may include a generation unit 910 and a communication unit 920.

Here, units of the CU device 900 may be included in a processing circuit. It should be noted that the CU device 900 may include one processing circuit or multiple processing circuits. Further, the processing circuit may include various discrete functional units to perform various functions and/or operations. It should be noted that these functional units may be physical entities or logical entities, and units with different names may be implemented by one physical entity.

According to an embodiment of the present disclosure, the generation unit 910 may generate selection information related to selection of a DU device serving a user equipment by the user equipment.

According to an embodiment of the present disclosure, the communication unit 920 may transmit the selection information generated by the generation unit 910 to the user equipment. Here, the user equipment involved by the selection information may be a user equipment in a service coverage of the CU device 900, such as the user equipment 200 described above.

As described above, the CU device 900 according to the embodiment of the present disclosure may generate the selection information related to the selection of a DU device by the user equipment, such that the user equipment may determine, according to the selection information, a DU device serving the user equipment 200. In this way, the user equipment can quickly and accurately find a most suitable DU device with the assistance of the CU device.

According to an embodiment of the present disclosure, as shown in FIG. 9, the CU device 900 may further include a calculation unit 930. The calculation unit 930 is configured to calculate a Doppler shift value between the user equipment and the DU device. According to an embodiment of the present disclosure, the selection information generated by the generation unit 910 is further related to a Doppler shift value between the user equipment and the DU device serving the user equipment.

According to an embodiment of the present disclosure, the selection information generated by the generation unit 910 may include: the DU device serving the user equipment.

According to an embodiment of the present disclosure, as shown in FIG. 9, the CU device 900 may further include a selection unit 940. The selection unit 940 is configured to select a suitable DU device for the user equipment.

According to an embodiment of the present disclosure, the CU device 900 may receive QoS requirement information of the user equipment from the user equipment through the communication unit 920. The selection unit 940 may determine, according to the QoS requirement information of the user equipment, the DU device serving the user equipment. Here, the QoS requirement information of the user equipment may include information such as a maximum bandwidth of the user equipment, a minimum Doppler shift value of the user equipment, a minimum delay between the user equipment and the CU device. For example, the calculation unit 930 may calculate a Doppler shift value between each DU device in the service coverage of the CU device 900 and the user equipment, such that the selection unit 940 may select a DU device having a Doppler shift value meeting the QoS requirement of the user equipment.

According to an embodiment of the present disclosure, the selection information generated by the generation unit 910 may further include a Doppler shift value between the user equipment and the DU device serving the user equipment.

According to an embodiment of the present disclosure, the calculation unit 930 may calculate, according to location information of the user equipment and location information of the DU device, the Doppler shift value between the user equipment and the DU device. In order to accurately calculate the Doppler shift value, the calculation unit 930 may calculate, according to the location information and speed information of the user equipment and the location information and speed information of the DU device, the Doppler shift value between the user equipment and the DU device. In addition, according to an embodiment of the present disclosure, after calculating the Doppler shift value between the user equipment and the DU device, the calculation unit 930 may further compensate, according to a transmission delay between the CU device 900 and the user equipment and a transmission delay between the CU device 900 and the DU device, the Doppler shift value obtained through calculation, such that a finally obtained Doppler shift value is more accurate.

According to an embodiment of the present disclosure, the CU device 900 may further receive location information and/or speed information of the user equipment from the user equipment through the communication unit 920. The CU device 900 may further receive ephemeris information of the DU device from the DU device through the communication unit 920. The ephemeris information includes, for example, location information, speed information, trajectory information, beam direction information, an access ID and frequency information of the DU device. The calculation unit 930 may calculate, according to information acquired from the user equipment and information acquired from the DU device, the Doppler shift value between the user equipment and the DU device.

According to an embodiment of the present disclosure, the selection unit 940 may determine, according to the Doppler shift value between the DU device and the user equipment, the DU device serving the user equipment. For example, the selection unit 940 may select a DU device having a minimum Doppler shift value with the user equipment.

According to an embodiment of the present disclosure, the selection information generated by the generation unit 910 may further include information such as beam direction information of the DU device and/or an access ID for the UE accessing the DU device.

According to an embodiment of the present disclosure, the selection information generated by the generation unit 910 may include one DU device or multiple DU devices. In the case of including multiple DU devices, the selection information may further include priority information of the multiple DU devices, such that the user equipment selects a DU device. The selection information generated by the generation unit 910 may include a Doppler shift value corresponding to the one DU device or each of the multiple DU devices.

As described above, the CU device 900 according to the embodiments of the present disclosure may select a suitable DU device for the user equipment and calculate the Doppler shift value between the user equipment and the DU device, such that the user equipment can access the suitable DU device.

According to an embodiment of the present disclosure, the CU device 900 may further receive request information for selecting a DU device from the user equipment, so as to generate selection information according to the request information. The CU device 900 may further acquire, according to the request information for selecting a DU device, at least one of the following information: the QoS requirement information of the user equipment, the location information of the user equipment, and the speed information of the user equipment.

According to an embodiment of the present disclosure, the selection information generated by the generation unit 910 may further include beam direction information and/or an access ID of each DU device.

According to an embodiment of the present disclosure, the calculation unit 930 may further update the Doppler shift value between the user equipment and the DU device, and transmit the updated Doppler shift value to the user equipment and the DU device. For example, the calculation unit 930 may recalculate, according to the updated location information and updated speed information of the user equipment and the updated ephemeris information of the DU device, the Doppler shift value between the user equipment and the DU device. Furthermore, according to an embodiment of the present disclosure, the CU device 900 may receive a Doppler shift value update request from the user equipment, and the update request may include updated location information and updated speed information of the user equipment. Optionally, the CU device 900 may receive a Doppler shift value update request from the DU device, and the update request may include updated ephemeris information of the DU device.

According to an embodiment of the present disclosure, the selection information generated by the generation unit 910 may further include a mapping relationship between location information of the user equipment and a DU device serving the user equipment.

According to an embodiment of the present disclosure, as shown in FIG. 9, the CU device 900 may further include a division unit 950. The division unit 950 is configured to divide a terrestrial service coverage of the CU device 900 into multiple location areas. According to an embodiment of the present disclosure, each of the location areas obtained by the division unit 950 dividing the terrestrial service coverage of the CU device 900 may be referred to as a virtual cell location area. Each virtual cell location area is identified with a virtual cell location area ID (VCLID). Furthermore, for each of the multiple location areas, the selection unit 940 may determine, according to performance parameters of all DU devices in the service coverage of the CU device, a DU device having a mapping relationship with the location area. Here, the performance parameter of the DU device includes a Doppler shift value between the DU device and the location area.

According to an embodiment of the present disclosure, for each of the multiple location areas, the calculation unit 930 may calculate a Doppler shift value between each of all DU devices in the service coverage of the CU device and the location area, such that the selection unit 940 may select one or more DU devices having a minimum Doppler shift value, as the DU device having a mapping relationship with the location area. Here the calculation unit 930 may select a location point in the location area to calculate the Doppler shift value between the DU device and the location area. For example, the location point may be a center point of the location area or a representative location point in the location area, which is not limited in the present disclosure.

According to an embodiment of the present disclosure, the selection information generated by the generation unit 910 may further include a mapping relationship between the location information of the user equipment and the Doppler shift value between the user equipment and the DU device serving the user equipment.

According to an embodiment of the present disclosure, one DU device or multiple DU devices may have a mapping relationship with a location area. In the case that the multiple DU devices have a mapping relationship with the location area, the selection information may further include priority information of the multiple DU devices. In addition, no matter whether one DU device or multiple DU devices has a mapping relationship with the location area, each DU corresponds to a Doppler shift value.

According to an embodiment of the present disclosure, the CU device 900 may carry mapping relationships for different location areas by using different subcarriers. That is, location areas and subcarriers are in one-to-one correspondence. Further, the CU device 900 may transmit the correspondence between the location areas and the subcarriers to the user equipment in advance, such that the user equipment receives selection information only on a corresponding subcarrier.

According to an embodiment of the present disclosure, in a case that the number of location areas determined by the division unit 950 is relative large, the CU device 900 may not have sufficient subcarriers to carry mapping relationships for different location areas. According to an embodiment of the present disclosure, the division unit 950 may determine a main location area and a sub location area. One main location area may include multiple sub location areas, such that the CU device 900 may carry mapping relationships for different main location areas using different subcarriers. That is, one subcarrier carries mapping relationships for multiple sub location areas in one main location area. Similarly, the CU device 900 may transmit the correspondence between the main location areas and the subcarriers to the user equipment in advance, such that the user equipment receives selection information only on a corresponding subcarrier.

According to an embodiment of the present disclosure, the CU device 900 may periodically transmit the selection information by broadcasting, preferably, every 5 minutes. That is, both a user equipment and a DU device in the service coverage of the CU device 900 can periodically receive the selection information.

As described above, the CU device 900 according to the embodiments of the present disclosure may generate the selection information related to selection of a DU device by the user equipment, such that the user equipment may determine, according to the selection information, the DU device serving the user equipment 200. In this way, the user equipment can quickly and accurately find a most suitable DU device with the assistance of the CU device. The CU device 900 may further generate selection information related to the Doppler shift value between the user equipment and the DU device, such that the user equipment may compensate a link according to the Doppler shift value. Furthermore, the CU device 900 may generate the selection information in response to request information for selecting a DU device from the user equipment, so as to transmit the selection information by unicasting. The CU device 900 may further periodically transmit selection information including a mapping relationship between a location area, a DU device and a Doppler shift value. Furthermore, the CU device may further update the Doppler shift value between the user equipment 200 and the DU device. That is, the CU device assists the user equipment 200 in accessing a more suitable DU device and calculates the Doppler shift value between the user equipment and the DU device, thereby reducing the initial Doppler shift during the user equipment 200 accessing the wireless communication system. In addition, the Doppler shift value is calculated by the CU device 900, which reduces amount of calculation performed by the user equipment and the DU device.

The CU device 900 according to the embodiments of the present disclosure may serve the user equipment 200. Therefore, all embodiments of the user equipment 200 described above are applicable herein.

4. Method Embodiment

Next, a wireless communication method performed by the user equipment 200 in a wireless communication system according to an embodiment of the present disclosure is described in detail below.

Figure 10:
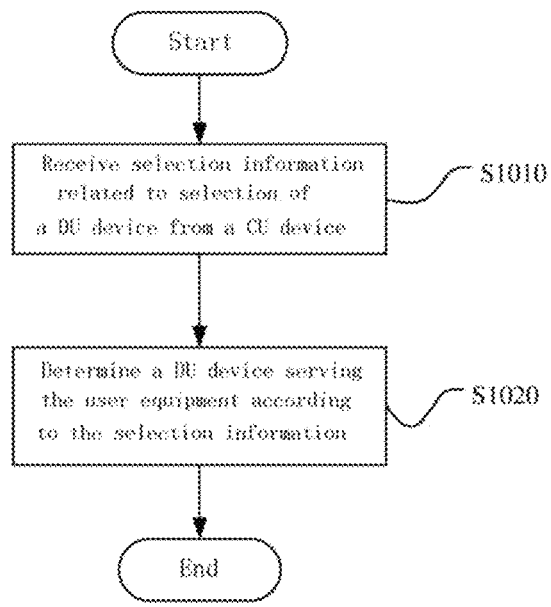
FIG. 10 is a flowchart of a wireless communication method performed by a user equipment according to an embodiment of the present disclosure.

FIG. 10 is a flowchart of the wireless communication method performed by the user equipment 200 in a wireless communication system according to an embodiment of the present disclosure.

As shown in FIG. 10, in step S1010, selection information related to selection of a DU device is received from a CU device.

Next, in step S1020, a DU device serving the user equipment is determined according to the selection information.

Preferably, the wireless communication method further includes: determining, according to the selection information, a Doppler shift value between the user equipment and the DU device serving the user equipment.

Preferably, the wireless communication method further includes: compensating a link between the user equipment and the DU device serving the user equipment according to the Doppler shift value.

Preferably, the wireless communication method further includes: determining a DU device included in the selection information as the DU device serving the user equipment, and determining a Doppler shift value corresponding to the DU device included in the selection information as the Doppler shift value between the user equipment and the DU device serving the user equipment.

Preferably, the wireless communication method further includes: transmitting at least one of the following parameters of the user equipment to the CU device: Quality-of-Service QoS requirement information, location information, and speed information, and receiving, from the CU device, selection information generated based on the at least one parameter.

Preferably, the wireless communication method further includes: transmitting a Doppler shift value update request to the CU device, and receiving, from the CU device, an updated Doppler shift value between the user equipment and the DU device serving the user equipment.

Preferably, the selection information includes a mapping relationship between location information of the user equipment and a DU device serving the user equipment.

Preferably, the determining the DU device serving the user equipment includes: determine, according to the location information of the user equipment and the mapping relationship, the DU device serving the user equipment.

Preferably, the selection information includes a mapping relationship between the location information of the user equipment and the Doppler shift value between the user equipment and the DU device serving the user equipment.

Preferably, the wireless communication method further includes: determining, according to the location information of the user equipment and the mapping relationship, the Doppler shift value between the user equipment and the DU device serving the user equipment.

According to the embodiments of the present disclosure, the above method may be performed by the user equipment 200 according to the embodiments of the present disclosure. Therefore, all embodiments of the user equipment 200 described above are applicable to the above method.

Next, a wireless communication method performed by the CU device 900 in a wireless communication system according to an embodiment of the present disclosure is described in detail below.

Figure 11:
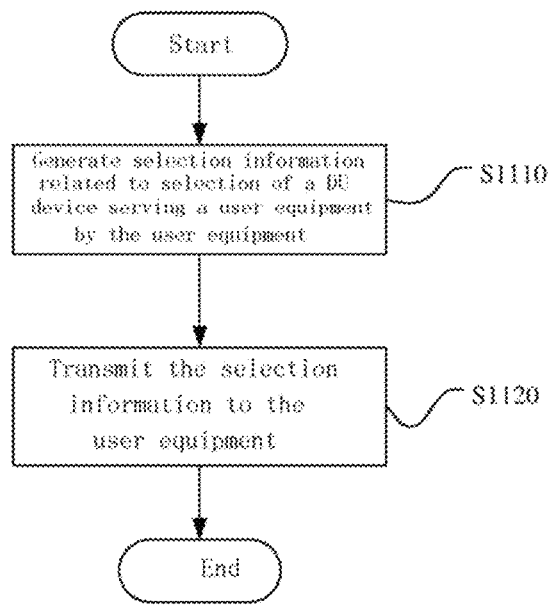
FIG. 11 is a flowchart of a wireless communication method performed by a Central Unit device according to an embodiment of the present disclosure.

FIG. 11 is a flowchart of the wireless communication method performed by the CU device 900 in a wireless communication system according to an embodiment of the present disclosure.

As shown in FIG. 11, in step S1110, selection information related to selection of a DU device serving a user equipment by the user equipment is generated.

Next, in step S1120, the selection information is transmitted to the user equipment.

Preferably, the selection information is further related to a Doppler shift value between the user equipment and the DU device serving the user equipment.

Preferably, the selection information includes the DU device serving the user equipment, and the Doppler shift value between the user equipment and the DU device serving the user equipment.

Preferably, the wireless communication method further includes: receiving, from the user equipment, at least one of the following parameters of the user equipment: Quality-of-Service QoS requirement information, location information, and speed information, and determining the selection information according to the at least one parameter.

Preferably, the wireless communication method further includes: receiving a Doppler shift value update request from the user equipment or the DU device serving the user equipment, and transmitting an updated Doppler shift value between the user equipment and the DU device serving the user equipment, to the user equipment and the DU device serving the user equipment.

Preferably, the selection information includes a mapping relationship between location information of the user equipment and the DU device serving the user equipment.

Preferably, the wireless communication method further includes: dividing a service coverage of the CU device into multiple location areas; and for each of the multiple location areas, determining, according to performance parameters of all DU devices in the service coverage of the CU device, a DU device having a mapping relationship with the location area.

Preferably, the performance parameter of the DU device includes a Doppler shift value between the DU device and the location area.

Preferably, the selection information includes a mapping relationship between the location information of the user equipment and the Doppler shift value between the user equipment and the DU device serving the user equipment.

Preferably, the wireless communication method further includes: periodically transmitting the selection information by broadcasting.

Preferably, the CU device is only one CU device that is activated in a predetermined area of a satellite communication system, and the predetermined area of the satellite communication system includes one or more CU devices that are not activated.

According to the embodiments of the present disclosure, the above method may be performed by the CU device 900 according to the embodiments of the present disclosure. Therefore, all embodiments of the CU device 900 described above are applicable to the above method.

5. Application Example

The technology according to the present disclosure may be applicable to various products.

The terrestrial base station device may be implemented as any type of base station device, such as a macro eNB and a small eNB. The terrestrial base station device may also be implemented as any type of gNB (a base station in a 5G system). The small eNB may be an eNB of a cell having a smaller coverage than a macro cell, such as a pico eNB, a micro eNB and a home (femto) eNB. Alternatively, the base station may be implemented as any other type of base station, such as a NodeB and a base transceiver station (BTS). The base station may include: a main body (also referred to as a base station device) configured to control the wireless communication; and one or more remote radio heads (RRH) arranged at a different location from the main body.

The user equipment may be implemented as a mobile terminal (such as a smartphone, a tablet personal computer (PC), a notebook PC, a portable game terminal, a portable/dongle mobile router and a digital camera) or a vehicle terminal (such as a vehicle navigation device). The user equipment may also be implemented as a terminal (which is also referred to as a machine type communication (MTC) terminal) performing machine to machine (M2M) communications. In addition, the user equipment may be a wireless communication module (such as an integrated circuit module including a single wafer) mounted on each of the above user equipments.

<Application Example of Base Station>

First Application Example

Figure 12:
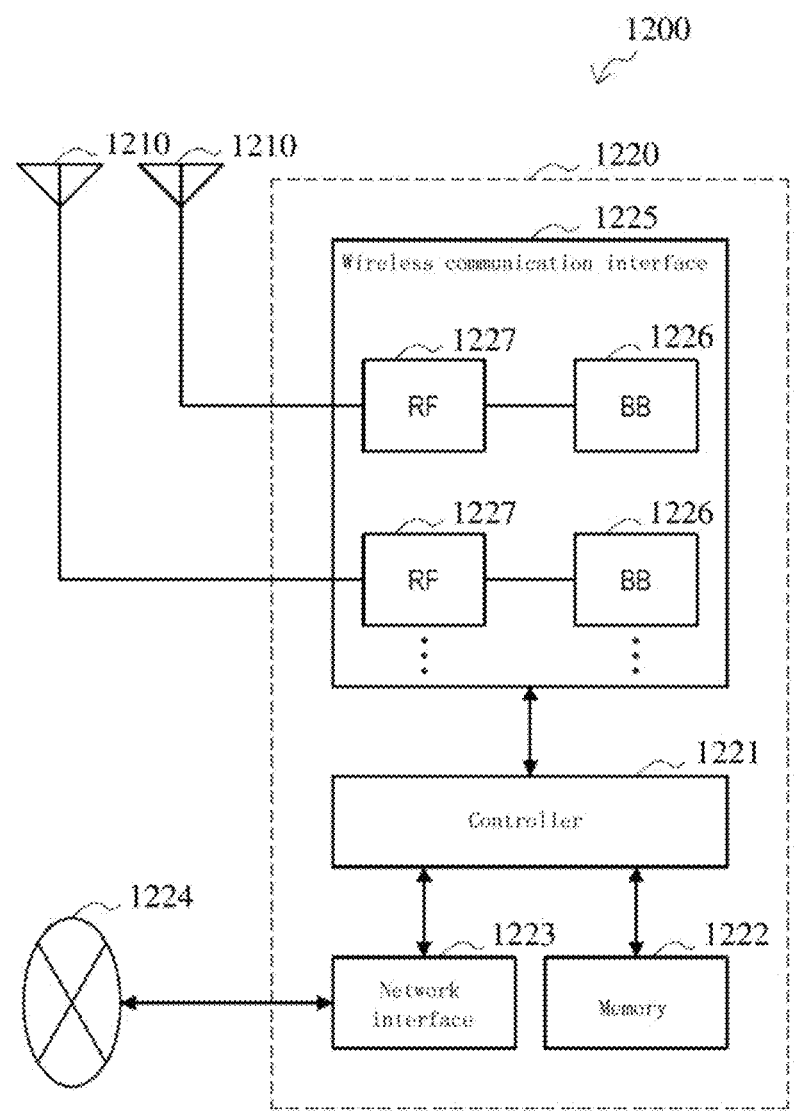
FIG. 12 is a block diagram showing a first exemplary configuration of an Evolved Node B (eNB)

FIG. 12 is a block diagram showing a first exemplary configuration of an eNB to which technology according to the present disclosure may be applied. An eNB 1200 includes one or more antennas 1210 and a base station device 1220. Each of the antennas 1210 is connected to the base station device 1220 via a RF cable.

Each of the antennas 1210 includes a single antenna element or multiple antenna elements (such as multiple antenna elements included in a multiple-input multiple-output (MIMO) antenna), and is used for the base station device 1220 to transmit and receive a wireless signal. The eNB 1200 may include multiple antennas 1210, as shown in FIG. 12. For example, the multiple antennas 1210 may be compatible with multiple frequency bands used by the eNB 1200. Although FIG. 12 shows an example in which the eNB 1200 includes the multiple antennas 1210, the eNB 1200 may also include a single antenna 1210.

The base station device 1220 includes a controller 1221, a memory 1222, a network interface 1223 and a wireless communication interface 1225.

The controller 1221 may be, for example, a CPU or a DSP, and operate various functions of a high layer of the base station device 1220. For example, the controller 1221 generates a data packet based on data in a signal processed by the wireless communication interface 1225 and transmits the generated packet via the network interface 1223. The controller 1221 may bundle data from multiple baseband processors to generate a bundled packet and transmit the generated bundled packet. The controller 1221 may have a logic function that performs control such as wireless resource control, wireless bearer control, mobility management, admission control, and scheduling. The control may be performed in combination with a nearby eNB or core network node. The memory 1222 includes an RAM and an ROM, and stores a program executed by the controller 1221 and various types of control data (such as a terminal list, transmission power data and scheduling data).

The network interface 1223 is a communication interface via which the base station device 1220 is connected to a core network 1224. The controller 1221 may communicate with a core network node or another eNB via the network interface 1223. In this case, the eNB 1200 may be connected to the core network node or another eNB via a logical interface (such as an interface S1 and an interface X2). The network interface 1223 may also be a wired communication interface or a wireless communication interface for wireless backhaul line. If the network interface 1223 is the wireless communication interface, the network interface 1223 may use a frequency band for wireless communication higher than a frequency band used by the wireless communication interface 1225.

The wireless communication interface 1225 supports any cellular communication scheme (such as long term evolution (LTE) and LTE-Advanced), and provides wireless connection to a terminal located in a cell of the eNB 1200 via an antenna 1210. The wireless communication interface 1225 may include, for example, a base band (BB) processor 1226 and an RF circuit 1227. The BB processor 1226 may perform, for example, encoding/decoding, modulating/demodulating and multiplexing/de-multiplexing, and various types of signal processing of layers (such as L1, medium access control (MAC), radio link control (RLC) and packet data convergence protocol (PDCP)). Instead of the controller 1221, the BB processor 1226 may have a part or all of the above logic functions. The BB processor 1226 may be implemented as a memory storing a communication control program, or a module including a processor configured to execute a program and related circuitry. The function of the BB processor 1226 may be changed by updating the program. The module may be a card or blade inserted into a slot of the base station device 1220. Alternatively, the module may be a chip mounted on the card or the blade. Further, the RF circuit 1227 may include, for example, a mixer, a filter or an amplifier, and transmits and receives a wireless signal via the antenna 1210.

As shown in FIG. 12, the wireless communication interface 1225 may include multiple BB processors 1226. For example, the multiple BB processors 1226 may be compatible with multiple frequency bands used by the eNB 1200. As shown in FIG. 12, the wireless communication interface 1225 may include multiple RF circuits 1227. For example, the multiple RF circuits 1227 may be compatible with multiple antenna elements. Although FIG. 12 shows an example in which the wireless communication interface 1225 includes the multiple BB processors 1226 and the multiple RF circuits 1227, the wireless communication interface 1225 may include a single BB processor 1226 or a single RF circuit 1227.

Second Application Example

Figure 13:
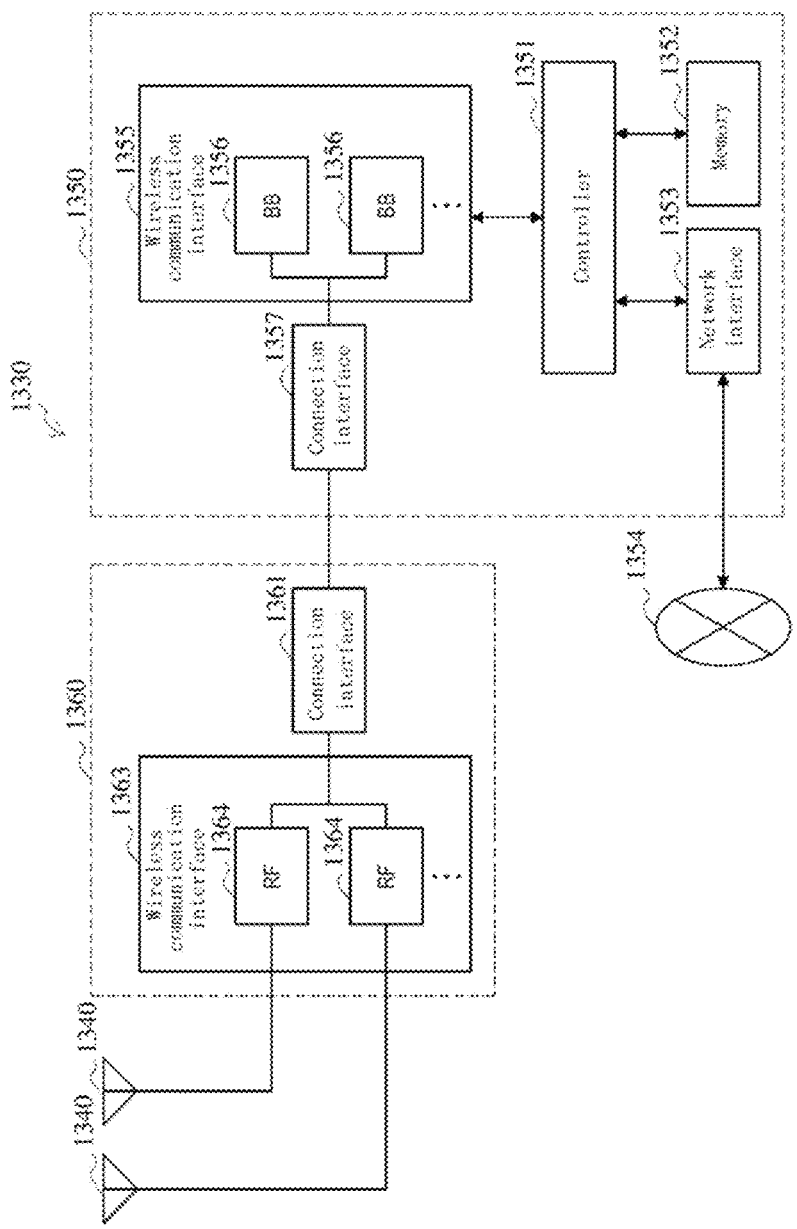
FIG. 13 is a block diagram showing a second exemplary configuration of the eNB.

FIG. 13 is a block diagram showing a second exemplary configuration of the eNB to which the technology of the present disclosure may be applied. An eNB 1330 includes one or more antennas 1340, a base station device 1350 and an RRH 1360. The RRH 1360 may be connected to each of the antennas 1340 via an RF cable. The base station device 1350 may be connected to the RRH 1360 via a high speed line such as an optical fiber cable.

Each of the antennas 1340 includes a single antenna element or multiple antenna elements (such as multiple antenna elements included in a MIMO antenna), and is used for the RRH 1360 to transmit and receive a wireless signal. As shown in FIG. 13, the eNB 1330 may include multiple antennas 1340. For example, the multiple antennas 1340 may be compatible with multiple frequency bands used by the eNB 1330. Although FIG. 13 shows an example in which the eNB 1330 includes the multiple antennas 1340, the eNB 1330 may also include a single antenna 1340.

The base station device 1350 includes a controller 1351, a memory 1352, a network interface 1353, a wireless communication interface 1355, and a connection interface 1357. The controller 1351, the memory 1352, and the network interface 1353 are respectively the same as the controller 1221, the memory 1222, and the network interface 1223 described with reference to FIG. 12.

The wireless communication interface 1355 supports any cellular communication schemes (such as LTE and LTE-advanced), and provides wireless communication with a terminal located in a sector corresponding to the RRH 1360 via the RRH 1360 and the antenna 1340. The wireless communication interface 1355 may generally include, for example, a BB processor 1356. Except for the BB processor 1356 being connected to an RF circuit 1364 of the RRH 1360 via the connection interface 1357, the BB processor 1356 is the same as the BB processor 1326 described with reference to FIG. 13. The wireless communication interface 1355 may include multiple BB processors 1356, as shown in FIG. 13. For example, the multiple BB processors 1356 may be compatible with multiple frequency bands used by the eNB 1330. Although FIG. 13 shows an example in which the wireless communication interface 1355 includes the multiple BB processors 1356, the wireless communication interface 1355 may also include a single BB processor 1356.

The connection interface 1357 is an interface for connecting the base station device 1350 (the wireless communication interface 1355) to the RRH 1360. The connection interface 1357 may also be a communication module for communication in the above high speed line that connects the base station device 1350 (the wireless communication interface 1355) to the RRH 1360.

The RRH 1360 includes a connection interface 1361 and a wireless communication interface 1363.

The connection interface 1361 is an interface for connecting the RRH 1360 (the wireless communication interface 1363) to the base station device 1350. The connection interface 1361 may also be a communication module for communication in the above-described high speed line.

The wireless communication interface 1363 transmits and receives a wireless signal via the antenna 1340. The wireless communication interface 1363 may generally include, for example, the RF circuit 1364. The RF circuit 1364 may include, for example, a mixer, a filter, and an amplifier, and transmits and receives a wireless signal via the antenna 1340. The wireless communication interface 1363 may include multiple RF circuits 1364, as shown in FIG. 13. For example, the multiple RF circuits 1364 may support multiple antenna elements. Although FIG. 13 shows an example in which the wireless communication interface 1363 includes the multiple RF circuits 1364, the wireless communication interface 1363 may also include a single RF circuit 1364.

In the eNB 1200 and the eNB 1330 respectively shown in FIG. 12 and FIG. 13, the generation unit 910, the calculation unit 930, the selection unit 940 and the division unit 950 that are shown in FIG. 9 may be implemented by the controller 1221 and/or the controller 1351. At least a part of functions may also be implemented by the controller 1221 and the controller 1351. For example, the controller 1221 and/or the controller 1351 may perform functions of generating the selection information, calculating a Doppler shift value, selecting a DU device and dividing a location area by executing instructions stored in a corresponding memory.

Application Example of Terminal Device

First Application Example

Figure 14:
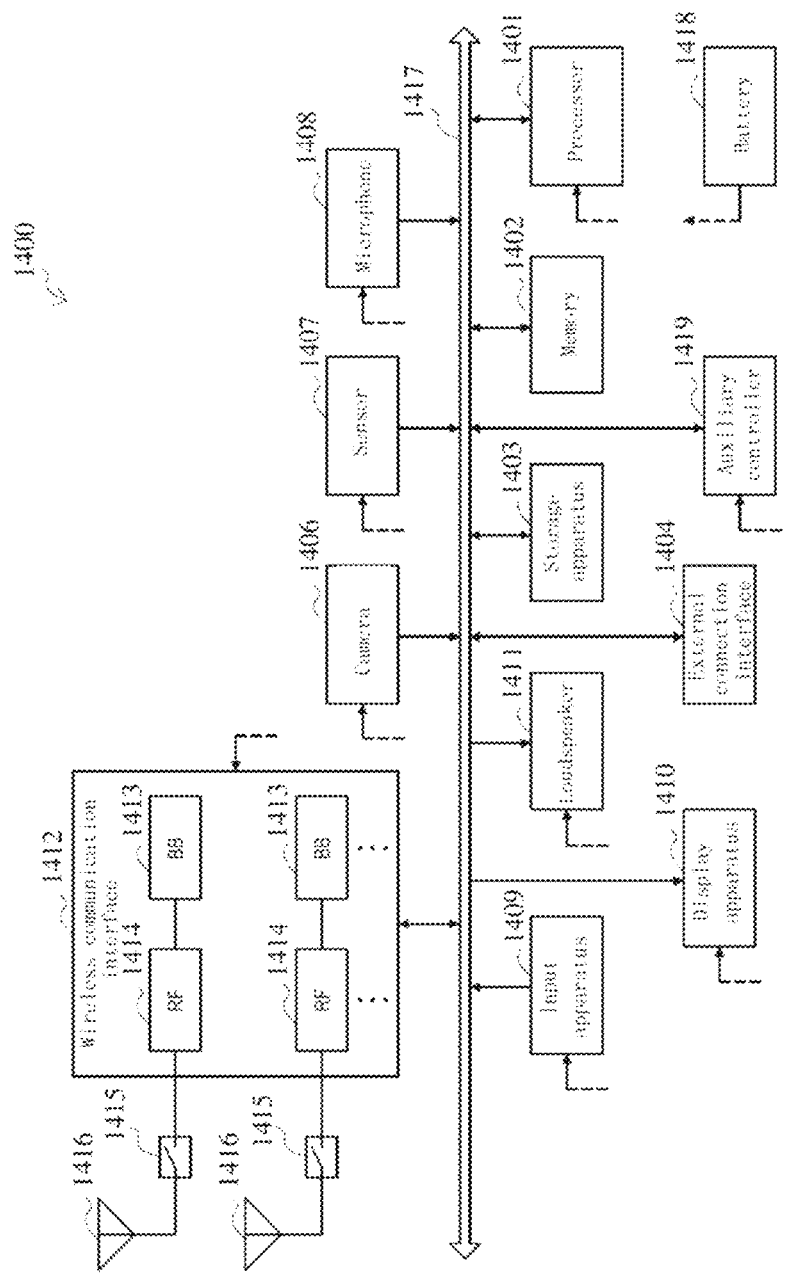
FIG. 14 is a block diagram showing an exemplary configuration of a smartphone.

FIG. 14 is a block diagram showing an exemplary configuration of a smartphone 1400 to which the technology according to the present disclosure may be applied. The smartphone 1400 includes a processor 1401, a memory 1402, a storage apparatus 1403, an external connection interface 1404, a camera 1406, a sensor 1407, a microphone 1408, an input apparatus 1409, a display apparatus 1410, a loudspeaker 1411, a wireless communication interface 1412, one or more antenna switches 1415, one or more antennas 1416, a bus 1417, a battery 1418 and an auxiliary controller 1419.

The processor 1401 may be, for example, a CPU or a system on chip (SoC), and controls functions of an application layer and another layer of the smartphone 1400. The memory 1402 includes an RAM and an ROM, and stores data and a program executed by the processor 1401. The storage apparatus 1403 may include a storage medium such as a semiconductor memory and a hard disk. The external connection interface 1404 is an interface for connecting an external apparatus (such as a memory card and a universal serial bus (USB) apparatus) to the smartphone 1400.

The camera 1406 includes an image sensor (such as a charge coupled device (CCD) and a complementary metal oxide semiconductor (CMOS)), and generates a captured image. The sensor 1407 may include a group of sensors such as a measurement sensor, a gyro sensor, a geomagnetic sensor, and an acceleration sensor. The microphone 1408 converts sound that is inputted to the smartphone 1400 into an audio signal. The input apparatus 1409 includes, for example, a touch sensor configured to detect a touch on a screen of the display apparatus 1410, a keypad, a keyboard, a button, or a switch, and receives an operation or information inputted from a user. The display apparatus 1410 includes a screen (such as a liquid crystal display (LCD) and an organic light-emitting diode (OLED) display), and displays an output image of the smartphone 1400. The loudspeaker 1411 is configured to convert an audio signal outputted from the smartphone 1400 into sound.

The wireless communication interface 1412 supports any cellular communication scheme (such as LTE and LTE-Advanced), and performs wireless communications. The wireless communication interface 1412 may include, for example, a BB processor 1413 and an RF circuit 1414. The BB processor 1413 may perform, for example, coding/decoding, modulating/demodulating and multiplexing/demultiplexing, and perform various types of signal processing for wireless communications. The RF circuit 1414 may include, for example, a mixer, a filter and an amplifier, and transmits and receives a wireless signal via an antenna 1416. The wireless communication interface 1412 may be a chip module having the BB processor 1413 and the RF circuit 1414 integrated thereon. As shown in FIG. 14, the wireless communication interface 1412 may include multiple BB processors 1413 and multiple RF circuits 1414. Although FIG. 14 shows an example in which the wireless communication interface 1412 includes the multiple BB processors 1413 and the multiple RF circuits 1414, the wireless communication interface 1412 may include a single BB processor 1413 or a single RF circuit 1414.

Besides the cellular communication scheme, the wireless communication interface 1412 may support an additional type of wireless communication scheme, such as a short-distance wireless communication scheme, a near field communication scheme and a wireless local area network (LAN) scheme. In this case, the wireless communication interface 1412 may include the BB processor 1413 and the RF circuit 1414 for each wireless communication scheme.

Each of the antenna switches 1415 switches a connection destination of the antenna 1416 among multiple circuits (such as circuits for different wireless communication schemes) included in the wireless communication interface 1412.

Each of the antennas 1416 includes a single antenna element or multiple antenna elements (such as multiple antenna elements included in an MIMO antenna), and is used for the wireless communication interface 1412 to transmit and receive a wireless signal. The smartphone 1400 may include multiple antennas 1416, as shown in FIG. 14. Although FIG. 14 shows an example in which the smartphone 1400 includes the multiple antennas 1416, the smartphone 1400 may also include a single antenna 1416.

In addition, the smartphone 1400 may include an antenna 1416 for each type of wireless communication scheme. In this case, the antenna switches 1415 may be omitted from the configuration of the smartphone 1400.

The processor 1401, the memory 1402, the storage apparatus 1403, the external connection interface 1404, the camera 1406, the sensor 1407, the microphone 1408, the input apparatus 1409, the display apparatus 1410, the loudspeaker 1411, the wireless communication interface 1412, and the auxiliary controller 1419 are connected to each other via the bus 1417. The battery 1418 supplies power to blocks of the smartphone 1400 shown in FIG. 14 via feeders that are partially shown with dashed lines in the drawings. The auxiliary controller 1419, for example, operates a minimum necessary function of the smartphone 1400 in a sleep mode.

In the smartphone 1400 shown in FIG. 14, the determination unit 220 and the compensation unit 230 that are shown in FIG. 2 may be implemented by the processor 1401 or the auxiliary controller 1419. At least a part of functions may also be implemented by the processor 1401 or the auxiliary controller 1419. For example, the processor 1401 or the auxiliary controller 1419 may perform functions of determining a DU device and compensating a link based on a Doppler shift value by executing instructions stored in the memory 1402 or the storage apparatus 1403.

Second Application Example

Figure 15:
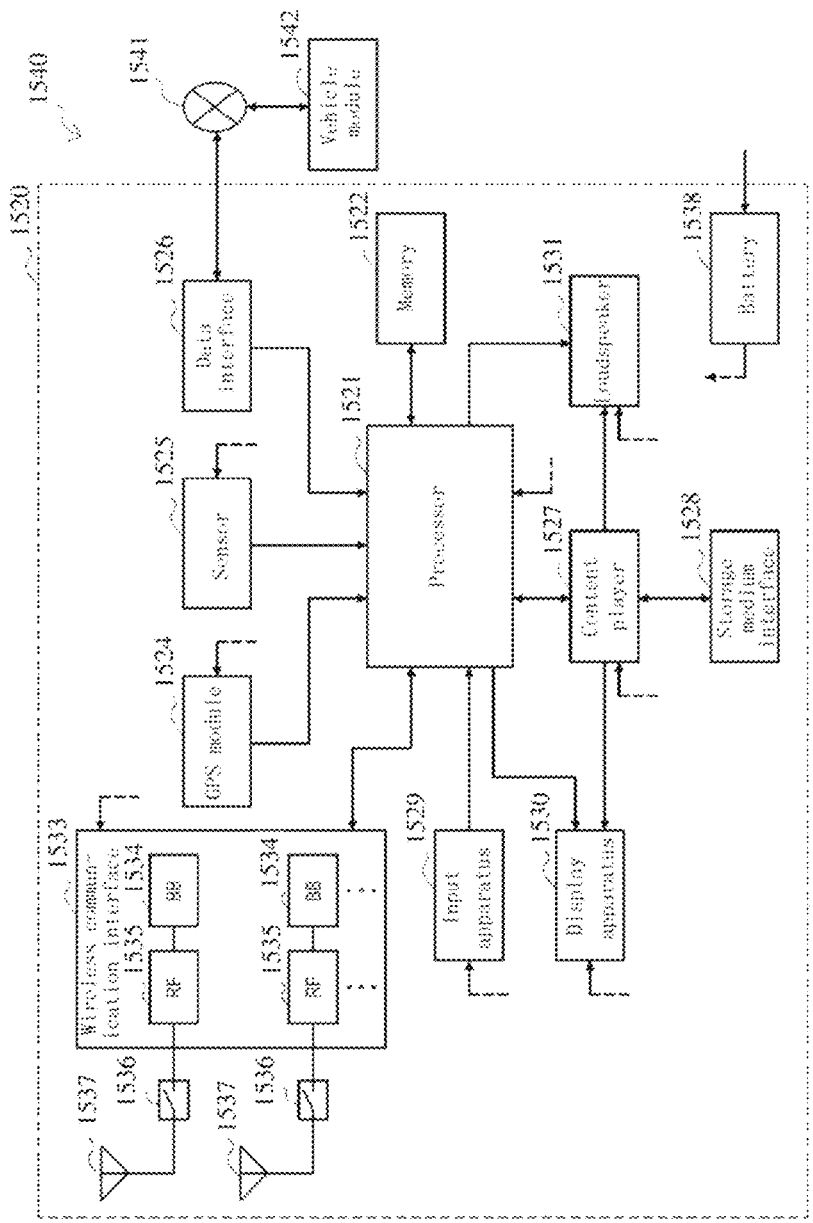
FIG. 15 is a block diagram showing an exemplary configuration of a vehicle navigation device.

FIG. 15 is a block diagram showing an exemplary configuration of a vehicle navigation device 1520 to which the technology according to the present disclosure may be applied. The vehicle navigation device 1520 includes a processor 1521, a memory 1522, a global positioning system (GPS) module 1524, a sensor 1525, a data interface 1526, a content player 1527, a storage medium interface 1528, an input apparatus 1529, a display apparatus 1530, a loudspeaker 1531, a wireless communication interface 1533, one or more antenna switches 1536, one or more antennas 1537, and a battery 1538.

The processor 1521 may be, for example, a CPU or a SoC, and controls a navigation function and another function of the vehicle navigation device 1520. The memory 1522 includes an RAM and an ROM, and stores a program executed by the processor 1521, and data.

The GPS module 1524 uses a GPS signal received from a GPS satellite to calculate a location (such as a latitude, a longitude, and an altitude) of the vehicle navigation device 1520. The sensor 1525 may include a group of sensors such as a gyro sensor, a geomagnetic sensor, and an air pressure sensor. The data interface 1526 is connected to, for example, a vehicle network 1541 via a terminal that is not shown, and acquires data (such as vehicle speed data) generated by the vehicle.

The content player 1527 reproduces content stored in a storage medium (such as a CD and a DVD) that is inserted into the storage medium interface 1528. The input apparatus 1529 includes, for example, a touch sensor configured to detect a touch on a screen of the display apparatus 1530, a button, or a switch, and receives an operation or information inputted by a user. The display apparatus 1530 includes a screen such as a LCD or an OLED display, and displays an image of the navigation function or reproduced content. The loudspeaker 1531 outputs sound of the navigation function or the reproduced content.

The wireless communication interface 1533 supports any cellular communication scheme (such as LTE and LTE-Advanced), and performs wireless communications. The wireless communication interface 1533 may generally include, for example, a BB processor 1534 and an RF circuit 1535. The BB processor 1534 may perform, for example, encoding/decoding, modulating/demodulating, and multiplexing/de-multiplexing, and performs various types of signal processing for wireless communications. In addition, the RF circuit 1535 may include, for example, a mixer, a filter, and an amplifier, and transmits and receives a wireless signal via the antenna 1537. The wireless communication interface 1533 may also be a chip module having the BB processor 1534 and the RF circuit 1535 integrated thereon. The wireless communication interface 1533 may include multiple BB processors 1534 and multiple RF circuits 1535, as shown in FIG. 15. Although FIG. 15 shows an example in which the wireless communication interface 1533 includes the multiple BB processors 1534 and the multiple RF circuits 1535, the wireless communication interface 1533 may include a single BB processor 1534 or a single RF circuit 1535.

In addition to a cellular communication scheme, the wireless communication interface 1533 may support another type of wireless communication scheme such as a short-distance wireless communication scheme, a near field communication scheme, and a wireless LAN scheme. In that case, the wireless communication interface 1533 may include a BB processor 1534 and an RF circuit 1535 for each wireless communication scheme.

Each of the antenna switches 1536 switches a connection destination of the antenna 1537 among multiple circuits (such as circuits for different wireless communication schemes) included in the wireless communication interface 1533.

Each of the antennas 1537 includes a single antenna element or multiple antenna elements (such as multiple antenna elements included in an MIMO antenna), and is used for the wireless communication interface 1533 to transmit and receive a wireless signal. The vehicle navigation device 1520 may include multiple antennas 1537, as shown in FIG. 15. Although FIG. 15 shows an example in which the vehicle navigation device 1520 includes the multiple antennas 1537, the vehicle navigation device 1520 may include a single antenna 1537.

Furthermore, the vehicle navigation device 1520 may include an antenna 1537 for each wireless communication scheme. In that case, the antenna switches 1536 may be omitted from the configuration of the vehicle navigation device 1520.

The battery 1538 supplies power to blocks of the vehicle navigation device 1520 shown in FIG. 15 via feeders that are partially shown as dashed lines in FIG. 15. The battery 1538 accumulates power supplied from the vehicle.

In the vehicle navigation device 1520 shown in FIG. 15, the determination unit 220 and the compensation unit 230 that are shown in FIG. 2 may be implemented by the processor 1521. At least a part of the functions may also be implemented by the processor 1521. For example, the processor 1521 may perform functions of determining a DU device and compensating a link based on a Doppler shift by executing instructions stored in the memory 1522.

The technology of the present disclosure may also be implemented as a vehicle system (or a vehicle) 1540 including one or more blocks in the vehicle navigation device 1520, the vehicle network 1541, and a vehicle module 1542. The vehicle module 1542 generates vehicle data (such as a vehicle speed, an engine speed, and fault information), and outputs the generated data to the vehicle network 1541.

Preferred embodiments of the present disclosure are described above with reference to the drawings. However, the present disclosure is not limited to the above examples.

Those skilled in the art may obtain various modifications and changes within the scope of the appended claims. It should understand that these modifications and changes fall within the technical scope of the present disclosure.

For example, a unit shown with a dashed-line block in functional block diagrams shown in the drawings is optional in a corresponding device. Further, optional functional units may be combined in a suitable manner to achieve required functions.

For example, in the above embodiments, multiple functions included in one unit may be achieved by separate apparatuses. Alternately, in the above embodiments, multiple functions achieved by multiple units may be achieved by separate apparatuses. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in detail with reference to the drawings, it should be understood that the above-described embodiments are merely used for illustrating the present disclosure rather than intended to limit the present disclosure. Those skilled in the art can make various modifications and variations to the above-described embodiments without departing from the substance and scope of the present disclosure. Therefore, the scope of the present disclosure is defined only by the appended claims and their equivalents.

The invention claimed is:

1. A user equipment, comprising a processing circuit configured to:
    receive, from a Central Unit CU device, selection information related to a plurality of Distributed Unit DU devices and Doppler shift values between the user equipment and each of the plurality of DU devices;
    determine, according to the selection information, a DU device from among the plurality of DU devices serving the user equipment; and
    determine, according to the selection information, the Doppler shift value corresponding to the determined DU device.

2. The user equipment according to claim 1, wherein the processing circuit is further configured to:
    compensate a link between the user equipment and the DU device serving the user equipment according to the Doppler shift value.

3. The user equipment according to claim 1, wherein the processing circuit is further configured to:
    transmit at least one of the following parameters of the user equipment to the CU device: Quality-of-Service QoS requirement information, location information, and speed information; and
    receive, from the CU device, selection information generated based on the at least one parameter.

4. The user equipment according to claim 1, wherein the processing circuit is further configured to:
    transmit a Doppler shift value update request to the CU device; and
    receive, from the CU device, an updated Doppler shift value between the user equipment and the DU device serving the user equipment.

5. The user equipment according to claim 1, wherein the selection information comprises a mapping relationship between location information of the user equipment and the DU device serving the user equipment.

6. The user equipment according to claim 5, wherein the processing circuit is further configured to:
    determine, according to the location information of the user equipment and the mapping relationship, the DU device serving the user equipment.

7. The user equipment according to claim 5, wherein the selection information comprises a mapping relationship between the location information of the user equipment and the Doppler shift value between the user equipment and the DU device serving the user equipment.

8. The user equipment according to claim 7, wherein the processing circuit is further configured to:
    determine, according to the location information of the user equipment and the mapping relationship, the Doppler shift value between the user equipment and the DU device serving the user equipment.

9. A Central Unit CU device, comprising a processing circuit configured to:
    generate selection information related to a plurality of Distributed Unit DU devices and Doppler shift values between a user equipment a user equipment and each of the plurality of DU devices; and
    transmit the selection information to the user equipment to determine a DU device from among the plurality of DU devices to serve the user equipment and determine the Doppler shift value for the determined DU device.

10. The CU device according to claim 9, wherein the processing circuit is further configured to:
    receive at least one of the following parameters of the user equipment from the user equipment: Quality-of-Service QoS requirement information, location information, and speed information; and
    determine the selection information according to the at least one parameter.

11. The CU device according to claim 9, wherein the processing circuit is further configured to:
    receive a Doppler shift value update request from the user equipment or the DU device serving the user equipment; and
    transmit an updated Doppler shift value between the user equipment and the DU device serving the user equipment, to the user equipment and the DU device serving the user equipment.

12. The CU device according to claim 9, wherein the selection information comprises a mapping relationship between location information of the user equipment and the DU device serving the user equipment.

13. The CU device according to claim 12, wherein the selection information comprises a mapping relationship between the location information of the user equipment and the Doppler shift value between the user equipment and the DU device serving the user equipment.

14. The CU device according to claim 12, wherein the processing circuit is further configured to:
    divide a service coverage of the CU device into a plurality of location areas; and
    for each of the plurality of location areas, determine, according to performance parameters of all DU devices in the service coverage of the CU device, a DU device having a mapping relationship with the location area.

15. The CU device according to claim 14, wherein performance parameter of the DU device comprises a Doppler shift value between the DU device and the location area.

16. A wireless communication method performed by a user equipment, the wireless communication method comprising:

receiving, from a Central Unit CU device, selection information related to a plurality of Distributed Unit DU devices and Doppler shift values between the user equipment and each of the plurality of DU devices;

determining, according to the selection information, a DU device from among the plurality of DU devices serving the user equipment; and determining, according to the selection information, the Doppler shift value corresponding to the determined DU device.

17. The wireless communication method according to claim 16, further comprising:

compensating a link between the user equipment and the DU device serving the user equipment according to the Doppler shift value.

18. The wireless communication method according to claim 16, further comprising:

transmitting at least one of the following parameters of the user equipment to the CU device: Quality-of-Service QoS requirement information, location information, and speed information; and receiving, from the CU device, selection information generated based on the at least one parameter.

19. The wireless communication method according to claim 16, further comprising:

transmitting a Doppler shift value update request to the CU device; and receiving, from the CU device, an updated Doppler shift value between the user equipment and the DU device serving the user equipment.

20. The wireless communication method according to claim 16, wherein the selection information comprises a mapping relationship between location information of the user equipment and the DU device serving the user equipment.

\* \* \* \* \*